(12) United States Patent
Fujiwara

(10) Patent No.: US 9,789,841 B2
(45) Date of Patent: Oct. 17, 2017

(54) SIDE AIRBAG DEVICE FOR VEHICLE

(71) Applicant: TOYOTA JIDOSHA KABUSHIKI KAISHA, Toyota-shi, Aichi-ken (JP)

(72) Inventor: Yusuke Fujiwara, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/912,671

(22) PCT Filed: Aug. 25, 2014

(86) PCT No.: PCT/JP2014/072196
§ 371 (c)(1),
(2) Date: Feb. 18, 2016

(87) PCT Pub. No.: WO2015/075984
PCT Pub. Date: May 28, 2015

(65) Prior Publication Data
US 2016/0264091 A1    Sep. 15, 2016

(30) Foreign Application Priority Data
Nov. 21, 2013    (JP) .................................. 2013-241323

(51) Int. Cl.
*B60R 21/207*    (2006.01)
*B60R 21/231*    (2011.01)
(Continued)

(52) U.S. Cl.
CPC ...... *B60R 21/23138* (2013.01); *B60R 21/207* (2013.01); *B60R 21/233* (2013.01);
(Continued)

(58) Field of Classification Search
CPC ............... B60R 21/207; B60R 21/233; B60R 21/23138; B60R 21/2346; B60R 2021/23324; B60R 2021/23146
See application file for complete search history.

(56) References Cited

U.S. PATENT DOCUMENTS 5,586,782 A    12/1996    Zimmerman, II et al.
6,032,977 A    3/2000    Reh et al.
(Continued)

FOREIGN PATENT DOCUMENTS

JP    H09-309399 A    12/1997
JP    H10-35399 A    2/1998
(Continued)

*Primary Examiner* — Faye M Fleming
(74) *Attorney, Agent, or Firm* — Oliff PLC

(57) ABSTRACT

To contribute to stabilizing the restraining of a head portion. When an air bag inflates and expands in a side airbag device for a vehicle, a rear bag portion accommodating an inflator inflates and expands earlier than and at a higher pressure than a front bag portion. The front bag portion, that is low pressure and inflates and expands later, can be supported by the rear bag portion that is high pressure, and the front bag portion does not shake greatly. Moreover, the flow of gas from the rear bag portion that is high pressure to the front bag portion that is low pressure can be regulated by the upper and lower communication ports formed in a tether. Due to the above, the expansion behavior of the front bag portion can be stabilized, which can therefore contribute to the restraining of the head portion by the front bag portion.

13 Claims, 11 Drawing Sheets

(51) Int. Cl.
*B60R 21/2346* (2011.01)
*B60R 21/233* (2006.01)
*B60R 21/237* (2006.01)

(52) U.S. Cl.
CPC ........ *B60R 21/237* (2013.01); *B60R 21/2346* (2013.01); *B60R 2021/23146* (2013.01); *B60R 2021/23324* (2013.01); *B60R 2021/23332* (2013.01)

(56) References Cited

U.S. PATENT DOCUMENTS

| | | | |
|---|---|---|---|
| 6,065,772 A | 5/2000 | Yamamoto et al. | |
| 6,478,329 B1 * | 11/2002 | Yokoyama | B60R 21/23138 280/729 |
| 8,056,923 B2 * | 11/2011 | Shimono | B60R 21/207 280/729 |
| 9,296,357 B2 * | 3/2016 | Fujiwara | B60R 21/207 |
| 9,505,374 B2 * | 11/2016 | Matsuzaki | B60R 21/207 |
| 2006/0131847 A1 | 6/2006 | Sato et al. | |
| 2008/0079248 A1 | 4/2008 | Hayashi | |
| 2010/0314859 A1 | 12/2010 | Tomitaka et al. | |
| 2015/0115583 A1 | 4/2015 | Azuma et al. | |
| 2015/0367803 A1 * | 12/2015 | Fujiwara | B60R 21/207 280/728.2 |
| 2015/0367804 A1 * | 12/2015 | Fujiwara | B60R 21/23138 280/730.2 |

FOREIGN PATENT DOCUMENTS

| | | |
|---|---|---|
| JP | H10-152011 A | 6/1998 |
| JP | H11-278195 A | 10/1999 |
| JP | 2000-185620 A | 7/2000 |
| JP | 2005-138665 A | 6/2005 |
| JP | 2006-082664 A | 3/2006 |
| JP | 2007-314076 A | 12/2007 |
| JP | 2008-080996 A | 4/2008 |
| JP | 2010-076711 A | 4/2010 |
| JP | 2012-025182 A | 2/2012 |
| WO | 2009/035114 A1 | 3/2009 |
| WO | 2013/168556 A1 | 11/2013 |

* cited by examiner

SIDE AIRBAG DEVICE FOR VEHICLE

TECHNICAL FIELD

The present invention relates to a side airbag device for a vehicle.

BACKGROUND ART

A side airbag device (a so-called near side airbag device), that is installed in the side portion at the vehicle transverse direction outer side of a seatback, is disclosed in following Patent Document 1. This side airbag device inflates and expands, by gas that is jetted-out from an inflator, an airbag that protects from the chest portion to the head portion of a vehicle occupant.

A side airbag device (a so-called far side airbag device), that is installed in the side portion at the vehicle transverse direction inner side (the vehicle central side) of a seatback, is disclosed in following Patent Document 2. This side airbag device inflates and expands, by gas that is jetted-out from an inflator, an airbag that protects from the abdomen portion to the head portion of a vehicle occupant. Note that inventions relating to side airbag devices for a vehicle are disclosed in following Patent Documents 3 through 5.

PRIOR ART DOCUMENTS

Patent Documents

Patent Document 1: Japanese Patent Application Laid-Open (JP-A) No. 2006-082664
Patent Document 2: International Publication No. 2009/035114
Patent Document 3: JP-A No. 2005-138665
Patent Document 4: JP-A No. 2000-185620
Patent Document 5: JP-A No. 2008-080996

SUMMARY OF INVENTION

Technical Problem

In side airbag devices such as mentioned above, there are structures in which the dimension in the vehicle height direction of the airbag is set to be large, and the head portion protecting portion of the airbag is not directly fixed to the seatback. Therefore, in a case in which the flow of gas, that is jetted-out from the inflator into the airbag, is not controlled well, the head portion protecting portion of the airbag shakes greatly at the time of inflation and expansion, and it can be thought that the restraining of the head portion of the vehicle occupant becomes unstable, In view of the aforementioned circumstances, an object of the present invention is to obtain a side airbag device for a vehicle that can contribute to stabilizing the restraining of a head portion.

Solution to Problem

A side airbag device for a vehicle of a first aspect of the present invention comprises: an inflator that generates gas by activating; an airbag that is provided at a side portion of a seatback of a vehicle seat, and that inflates and expands toward a vehicle front side of the side portion due to gas being supplied to an interior thereof, the airbag being capable of restraining at least from a chest portion to a head portion of a vehicle occupant; and a partitioning portion that has a laterally extending portion extending toward a front side of the seatback from a vertical direction intermediate portion of a rear end portion of the airbag that has inflated and expanded, and a vertically extending portion extending toward an upper side of the seatback from a longitudinal direction intermediate portion of a lower end portion of the airbag that has inflated and expanded, and that partitions the airbag into a rear bag portion, that is for restraining at least a rear portion of the chest portion of the vehicle occupant, and a front bag portion, that is for restraining at least the head portion and a front portion of the chest portion of the vehicle occupant, a plurality of communication ports being formed at the partitioning portion for supplying, into the front bag portion, gas from the inflator that is accommodated within the rear bag portion.

Note that, in the first aspect, the size of the airbag, the shape of the partitioning portion, and the like are set by using, for example, an AM50 (50th percentile U.S. adult male) World SID (internationally standardized side crash dummy: World Side Impact Dummy).

In the first aspect, at the time when the vehicle is in a side collision for example, the inflator is activated. Thereupon, gas is generated within the rear hag portion of the airbag in which this inflator is accommodated, and the gas within the rear bag portion is supplied into the front bag portion through the plural communication ports formed in the partitioning portion. Due thereto, the airbag inflates and expands toward the vehicle front side of the side portion of the seatback. At this time, because the rear bag portion that accommodates the inflator inflates and expands earlier than and at a higher pressure than the front bag portion, the front bag portion, that is low pressure and that inflates and expands later, can be supported by the rear bag portion that is high pressure. Due thereto, it can be made such that the front bag portion does not shake greatly. Moreover, the flow of gas from the rear bag portion that is high pressure to the front bag portion that is low pressure can be regulated by the plural communication ports that are formed in the tether, Due to the above, the expansion behavior of the front bag portion can be stabilized, and therefore, this can contribute to stabilizing the restraining of the head portion by the front bag portion. ¥

In a side airbag device for a vehicle of a second aspect of the present invention, in the first aspect, a shoulder restraining portion, for restraining at least a portion of a shoulder portion of the vehicle occupant, is provided at an upper portion of the rear bag portion.

In the second aspect, at least a portion of the shoulder portion of the vehicle occupant can be restrained by the rear bag portion that is high pressure. Due thereto, this can contribute to an improvement in the performance of restraining the shoulder portion.

In a side airbag device for a vehicle of a third aspect of the present invention, in the second aspect, the shoulder restraining portion is structured so as to, in an inflated and expanded state of the airbag, project-out further toward a front side of the seatback than a lower portion of the rear bag portion.

In the third aspect, the shoulder restraining portion, that is provided at the upper portion of the rear bag portion, projects-out further toward the front side of the seatback than the lower portion of the rear bag portion (i.e., the region for restraining at least the rear portion of the chest portion of the vehicle occupant). Due thereto, the shoulder portion restraining surface area at the rear bag portion that is high pressure can be ensured to be wide, and therefore, this can contribute more to improving the shoulder portion restraining performance.

A side airbag device for a vehicle of a fourth aspect of the present invention comprises, in the third aspect, a flow regulating member that distributes gas, that is generated from the inflator, to an upper portion and a lower portion of the rear bag portion, and a front end portion of the shoulder restraining portion is structured so as to be formed in an arc shape that is convex toward the vehicle front side, as seen in a side view of the airbag that is in the inflated and expanded state.

In the fourth aspect, the gas that is generated from the inflator is distributed to the upper portion and the lower portion of the rear bag portion by the flow regulating member. The gas, that has been distributed to the upper portion of the rear bag portion, flows into the shoulder restraining portion from the upper portion side, and flows along the front end portion of the aforementioned arc shape to the lower portion side of the shoulder restraining portion. Because the flow of gas can be made to be fast at this time, this can contribute to the effect of accelerating the inflation and expansion of the shoulder restraining portion.

In a side airbag device for a vehicle of a fifth aspect of the present invention, in any one of the second through fourth aspects, the partitioning portion is structured by a tether in which the plurality of communication ports are formed, and a width dimension of the tether, at a region that is positioned between the shoulder restraining portion and the front bag portion, is reduced.

In the fifth aspect, because the tether, that partitions the airbag into the front bag portion and the rear bag portion, is structured as described above, the dimension in the vehicle transverse direction of the shoulder restraining portion in the inflated and expanded state of the airbag (the inflated width) can be made to be thin. Due thereto, in a case in which the airbag is provided at the side portion at the vehicle transverse direction inner side of the seatback, due to the shoulder portion, at which the body width is largest of the body of the vehicle occupant, interfering with the shoulder restraining portion first, the entire airbag being displaced (escaping) inadvertently toward the vehicle transverse direction inner side (the side opposite the vehicle occupant) can be prevented or suppressed. On the other hand, in a case in which the airbag is provided at the side portion at the vehicle transverse direction outer side of the seatback, the performance of the shoulder restraining portion expanding into the narrow gap between the shoulder portion and the vehicle body side portion can be made to be good. Due to the above, in both of the above-described cases, this can contribute to an improvement in the vehicle occupant restraining performance of the airbag.

In a sixth aspect of the present invention, in any one of the first through fourth aspects, the partitioning portion partitions the airbag into the front bag portion and the rear bag portion by a sewn portion at which a base cloth of the airbag is sewn, and the plurality of communication ports are formed due to the sewn portion being partially omitted between the front bag portion and the rear bag portion.

In the sixth aspect, the airbag is partitioned into the front bag portion and the rear bag portion by the sewn portion at which the base cloth of the airbag is sewn. Further, the plural communication ports are formed due to the above-described sewn portion being omitted partially between the front bag portion and the rear bag portion. Due thereto, the partitioning portion can be made to be a simple structure.

In a side airbag device for a vehicle of a seventh aspect of the present invention, in any one of the first through sixth aspects, an upper side communication port, that communicates an upper portion of the rear bag portion and an upper portion of the front bag portion in a vertical direction of the airbag, and a lower side communication port, that communicates a lower portion of the rear bag portion and a lower portion of the front bag portion in a longitudinal direction of the airbag, are included among the plurality of communication ports.

In the seventh aspect, the gas that is generated from the inflator is supplied (distributed) through the upper side communication port and the lower side communication port of the tether, from the upper portion and the lower portion of the rear bag portion to the upper portion and the lower portion of the front bag portion. Moreover, the directions in which the upper side communication port and the lower side communication port communicate the rear bag portion and the front bag portion differ as described above. Due thereto, the gas, that is supplied through the lower side communication port to the lower portion of the front bag portion, can be made to not inadvertently interfere with the gas that is supplied through the upper side communication port to the upper portion of the front bag portion. As a result, this can contribute even more to the effect of stabilizing the expansion behavior of the upper portion of the front bag portion (i.e., the region for restraining the head portion of the vehicle occupant).

An eighth aspect of the present invention comprises, in the seventh aspect, a flow regulating member that is provided within the rear bag portion, and that distributes gas, that is generated from the inflator, from an upper end opening and a lower end opening to an upper portion and a lower portion of the rear bag portion, wherein the flow regulating member is formed in a tubular shape whose diameter increases from the upper end opening toward the lower end opening.

In the eighth aspect, the gas that is generated from the inflator is distributed to the upper portion and the lower portion of the rear bag portion, from the upper end opening and the lower end opening of the flow regulating member that is provided within the rear bag portion. Because the flow regulating member is formed in the shape of a tube whose diameter increases from the upper end opening toward the lower end opening, more gas can be distributed to the lower portion of the rear bag portion than to the upper portion. As a result, the flow rate of the gas, that is supplied from the lower portion of the rear bag portion through the lower side communication port of the partitioning portion to the lower portion of the front bag portion, increases, whereas the flow rate of the gas, that is supplied from the upper portion of the rear bag portion through the upper side communication port of the partitioning portion to the upper portion of the front bag portion, decreases. Some of the gas, that has been supplied more to the lower portion of the front bag portion, flows also to the upper portion of the front bag portion. Therefore, gas is supplied to the upper portion of the front bag portion by two paths that are the path from the upper side communication port and the path from the lower portion of the front bag portion. Further, by making the flow rates of the gases that are supplied by these two flow paths be well-balanced, the front bag portion can be inflated and expanded stably from the lower side toward the upper side.

In a ninth aspect of the present invention, in the eighth aspect, the upper side communication port of the partitioning portion is set so as to face the upper end opening of the flow regulating member, and the lower side communication port of the partitioning portion is set so as to face the lower end opening of the flow regulating member.

Because the ninth aspect is structured as described above, the gas, that has been distributed from the upper end opening and the lower end opening of the flow regulating member to the upper portion and the lower portion of the rear bag portion, can be supplied through the upper side communication port and the lower side communication port of the partitioning portion, smoothly to the upper portion and the lower portion of the front bag portion.

In a tenth aspect of the present invention, in the ninth aspect, a shoulder restraining portion for restraining a shoulder portion of the vehicle occupant is provided at an upper portion of the rear bag portion, and the upper end opening of the flow regulating member is set further toward an upper end side of the rear bag portion than a region for restraining a center of the shoulder portion of the vehicle occupant at the shoulder restraining portion.

In the tenth aspect, the upper end opening of the flow regulating member is set further toward the upper end side of the rear bag portion (i.e., of the partitioning portion, the side of the region that partitions the upper portion of the rear bag portion and the upper portion of the front bag portion) than the region for restraining the center of the shoulder portion of the vehicle occupant at the shoulder restraining portion that is provided at the upper portion of the rear bag portion. Because the upper side communication port is set at the partitioning portion so as to face the upper end opening of the flow regulating member, the gas, that is distributed (jetted-out) to the upper portion of the rear bag portion from the upper end opening at the time when the inflator operates, is supplied prioritarily through the upper side communication port to the upper portion of the front bag portion, and not into the shoulder restraining portion. Due thereto, it can be made such that the shoulder restraining portion does not become too high pressure in the initial stage of inflation and expansion. As a result, for example, even in a case in which the shoulder restraining portion inflates and expands in a state in which the head portion of a child, or the like, exists at an improper position that is the inflation and expansion region of the shoulder restraining portion, the load applied to the head portion of the child, or the like, can be lessened.

In an eleventh aspect of the present invention, in any one of the seventh through tenth aspects, an opening surface area of the lower side communication port is set to be greater than an opening surface area of the upper side communication port.

In the eleventh aspect, the gas, that the inflator has generated within the rear bag portion, is supplied through the lower side communication port and the upper side communication port of the partitioning portion, to the upper portion and the lower portion of the front bag portion. The opening surface area of the lower side communication port is set to be greater than the opening surface area of the upper side communication port. Therefore, the flow rate of the gas, that is supplied from the lower portion of the rear bag portion through the lower side communication port of the partitioning portion to the lower portion of the front bag portion, increases, whereas the flow rate of the gas, that is supplied from the upper portion of the rear bag portion through the upper side communication port of the partitioning portion to the upper portion of the front bag portion, decreases. Some of the gas, that has been supplied more to the lower portion of the front bag portion, flows also to the upper portion of the front bag portion. Therefore, gas is supplied to the upper portion of the front bag portion by two paths that are the path from the upper side communication port and the path from the lower portion of the front bag portion. Further, by making the flow rates of the gases that are supplied by these two flow paths be well-balanced, the front bag portion can be inflated and expanded stably from the lower side toward the upper side In a twelfth aspect of the present invention, in any one of the seventh through eleventh aspects, at the airbag, a head restraining region that is further toward an upper side than the partitioning portion is folded-up by roll-folding or bellows-folding toward a lower side of the airbag, and a region that is further toward a lower side than the head restraining region is folded-up by roll-folding or bellows-folding toward the lower side of the airbag and a rear side of the airbag, and the airbag is accommodated in the side portion of the seatback in a folded-up state, and an upper end of the airbag in an accommodated state is structured so as to be positioned further toward an upper end side of the seatback than the upper side communication port in the inflated and expanded state of the airbag.

In the twelfth aspect, at the airbag, the head restraining region, that is further toward the upper side than the partitioning portion, is folded-up by roll-folding or bellows-folding toward the lower side of the airbag. Moreover, at this airbag, the region (hereinafter called "obliquely folded region"), that is further toward the lower side than the head restraining region, is folded-up by roll-folding or bellows-folding toward the lower side of the airbag and the rear side of the airbag. Due thereto, the airbag is set in a state in which it easily inflates and expands stably from the lower side toward the upper side.

Further, in the present aspect, the airbag that is folded-up as described above is accommodated in the side portion of the seatback. Further, there is a structure in which the upper end of the airbag that is in this accommodated state is positioned further toward the upper end side of the seatback than the upper side communication port in the inflated and expanded state of the airbag. Therefore, there is no need to, in addition to the above-described folding-up at the obliquely folded region, further fold-up the vicinity of the upper side communication port at the airbag, and thus, it can be made such that the upper side communication port is not set in a substantially blocked state due to the folding-up. Due thereto, the gas, that the inflator generated within the rear bag portion, can be supplied in a well-balanced manner from the upper side communication port and the lower side communication port to the upper portion and the lower portion of the front bag portion. Due to the above, in the present aspect, the airbag (and the front bag portion in particular) can be inflated and expanded stably from the lower side toward the upper side.

A thirteenth aspect of the present invention comprises, in the twelfth aspect, a flow regulating member that is provided within the rear bag portion, and that distributes gas, that is generated from the inflator, from an upper end opening and a lower end opening to an upper portion and a lower portion of the rear bag portion, wherein the upper side communication port of the partitioning portion is set so as to face the upper end opening of the flow regulating member from an upper side of the airbag, and a shoulder restraining portion, for restraining at least a portion of a shoulder portion of the vehicle occupant, is provided at an upper portion of the rear bag portion.

In the thirteenth aspect, the gas that is generated from the inflator is distributed from the upper end opening and the lower end opening of the flow regulating member, that is provided within the rear bag portion, to the upper portion and the lower portion of the rear bag portion. The gas, that is distributed from the upper end opening of the flow regulating member to the upper portion of the rear bag portion, heads toward the upper side communication port side of the partitioning portion that is set so as to face the upper end opening of the flow regulating member from the upper side of the airbag. At this time, in the present aspect, as described in the twelfth aspect, because gas can be supplied smoothly from the upper side communication port to the upper portion of the front bag portion, gas can be supplied prioritarily to the upper portion of the front bag portion, and not into the shoulder restraining portion that is provided at the upper portion of the rear bag portion. Due thereto, it is possible to make it such that the shoulder restraining portion does not become too high pressure in the initial stage of inflation and expansion. As a result, for example, even in a case in which the shoulder restraining portion inflates and expands in a state in which the head portion of a child, or the like, exists at an improper position that is the inflation and expansion region of the shoulder restraining portion, the load applied to the head portion of the child, or the like, can be lessened.

Advantageous Effects of Invention

As described above, the side airbag device for a vehicle relating to the present invention can contribute to stabilizing the restraining of a head portion.

DESCRIPTION OF EMBODIMENTS

<First Embodiment>

A side airbag device 10 for a vehicle relating to a first embodiment of the present invention is described hereinafter by using FIG. 1 through FIG. 4. Note that arrow FR, arrow UP and arrow OUT that are marked appropriately in the respective drawings indicate the frontward direction (advancing direction) of the vehicle, the upward direction, and the outer side in the vehicle transverse direction, respectively. Further, when explanation is given hereinafter by using merely longitudinal, left-right, and vertical directions, they mean the longitudinal of the vehicle longitudinal direction, the left and right of the vehicle left-right direction (the vehicle transverse direction), and the vertical of the vehicle vertical direction, unless otherwise indicated.

(Structure)

Figure 1:
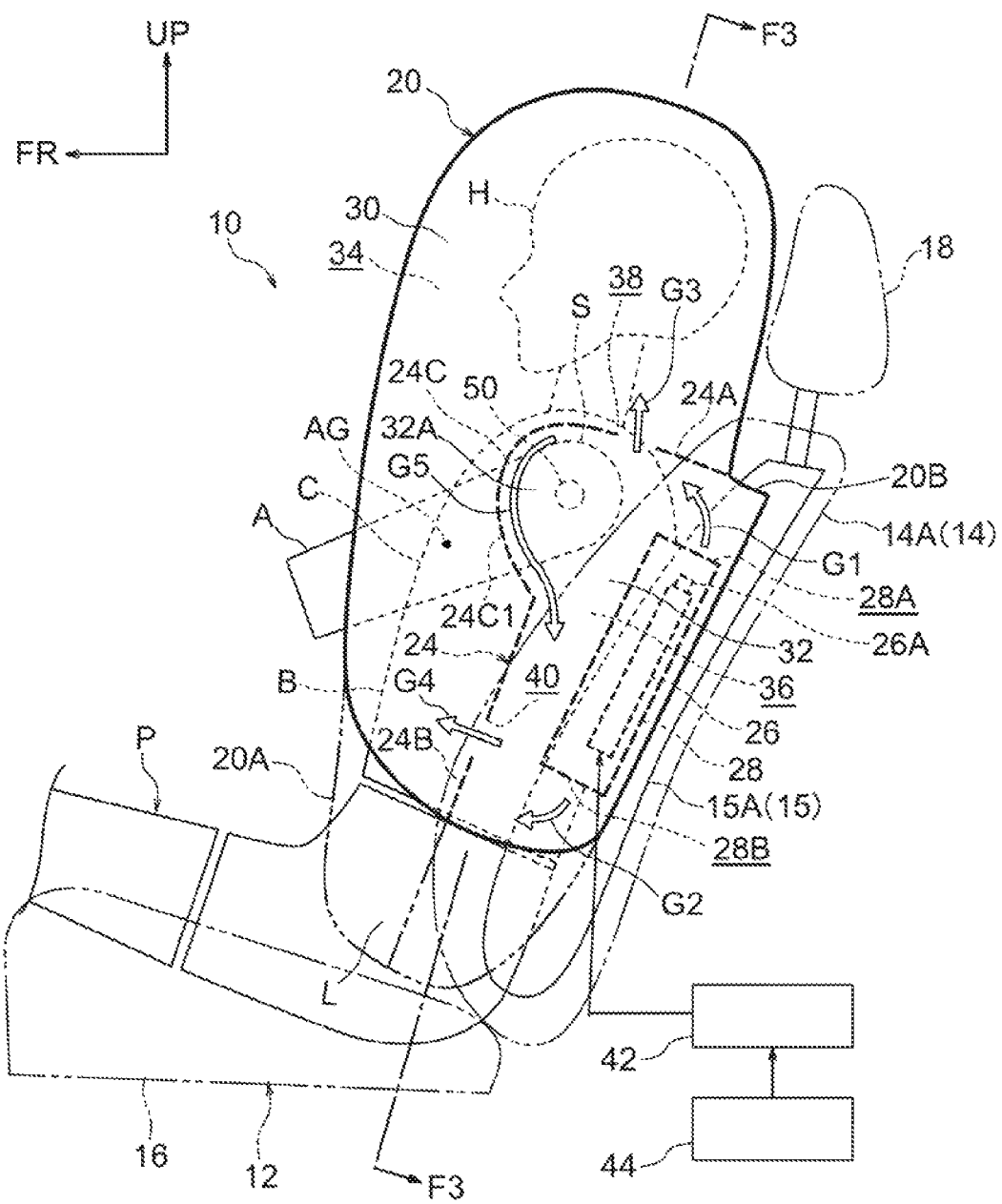
FIG. 1 is a side view of a vehicle seat in which a side airbag device for a vehicle relating to a first embodiment of the present invention is installed, and is a drawing showing a state in which an airbag has inflated and expanded.

As shown in FIG. 1, the side airbag device 10 for a vehicle relating to the present embodiment is a so-called far side airbag device, and is installed in a side support portion 14A that is at the vehicle transverse direction central side of a seatback 14 of a vehicle seat 12 (the side portion at the vehicle transverse direction central side: hereinafter simply called "central-side side portion 14A"). The aforementioned vehicle seat 12 is, for example, the driver's seat of a right hand drive vehicle. The seatback 14 of this vehicle seat 12 is reclinably connected to the rear end portion of a seat cushion 16, and a headrest 18 is connected to the upper end portion of the seatback 14.

Note that, in the present embodiment, the longitudinal direction, the left-right direction (the transverse direction), and the vertical direction of the vehicle seat 12 coincide with the longitudinal direction, the left-right direction (the transverse direction), and the vertical direction of the vehicle. Further, in FIG. 1, a dummy P for a crash test is seated in the vehicle seat 12 instead of an actual vehicle occupant. This dummy P is, for example, an AM50 (50th percentile U.S. adult male) World SID (internationally standardized side crash dummy: World Side Impact Dummy) This dummy P is seated in a standard seated posture that is prescribed by the crash test method, and the vehicle seat 12 is positioned at a reference set position that corresponds to the this seated posture. Hereinafter, the dummy P is called "vehicle occupant P" in order to make the explanation easy to understand.

The side airbag device 10 for a vehicle is a device for protecting mainly the vehicle occupant at the side opposite the collision side at the time of a side collision of the vehicle, and is equipped with an airbag 20 (far side airbag: bag body) that is disposed in the central-side side portion 14A. A tether 24 (partitioning cloth: partitioning member) that serves as a partitioning portion, an inflator 26 (gas generating device), and a flow regulating cloth 28 (inner tube: flow regulating member) are disposed at the interior of this airbag 20. The flow regulating cloth 28 is a diffuser (a loop diffuser) for regulating the flow of the gas that the inflator 26 generates. The respective structural elements of the side airbag device 10 for a vehicle are described hereinafter.

The airbag 20 is made into a module together with the inflator 26 and the like, and is disposed (accommodated) within the central-side side portion 14A in a folded-up state. This airbag 20 inflates and expands (the state shown in FIG. 1) toward the vehicle transverse direction inner side of the vehicle occupant P (the front side of the central-side side portion 14A) due to the pressure of the gas generated from the inflator 26. This is a structure in which, at the time of this inflation and expansion, the seatback pad and seat skin (neither of which are illustrated) that are disposed at the central-side side portion 14A receive the inflation pressure of the airbag 20 and are ruptured. Note that, unless otherwise indicated, the longitudinal, left-right and vertical directions of the airbag 20 that are mentioned in the following description indicate the directions in the state in which the airbag 20 is inflated and expanded, and substantially coincide with the longitudinal, left-right and vertical directions of the seatback 14.

This airbag 20 is formed in the shape of an elongated bag due to a base cloth, that is formed by cutting-out a nylon or polyester cloth material for example, being folded in two and the outer peripheral edge portion thereof being sewn. This airbag 20 is formed so as to form a substantially oval shape that is elongated along the vehicle vertical direction, when the inflated and expanded state such as shown in FIG. 1 is viewed from the side surface side (here, the vehicle transverse direction inner side), and can restrain at least from a head portion H to an abdomen portion B of the vehicle occupant P. The interior of this airbag 20 is partitioned (sectioned) into two front and rear chambers 34, 36 by the tether 24.

The aforementioned tether 24 is a member that is formed by a cloth material, that is similar to the base cloth of the airbag 20, being cut-out in the shape of an elongated belt, and one long side edge portion thereof is sewn to one side portion of the base cloth of the airbag 20, and the other long side edge portion is sewn to the other side portion of the base cloth of the airbag 20. Due to this tether 24, the airbag 20 is partitioned into a front bag portion 30, that is for restraining the front portions of a chest portion C and the abdomen portion B, and the head portion H, of the vehicle occupant P, and a rear bag portion 32 that is for restraining the rear portions of the chest portion C and the abdomen portion B, and a shoulder portion S. The interior of the front bag portion 30 is made to be the front chamber 34, and the interior of the rear bag portion 32 is made to be the rear chamber 36.

As shown in FIG. 1, this tether 24 has a laterally extending portion 24A that extends toward the front side of the seatback 14 from the front end of a step portion 20B that is formed at a vertical direction intermediate portion of the rear end of the airbag 20, and a vertically extending portion 24B that extends toward the upper side of the seatback 14 from a longitudinal direction intermediate portion of the lower end of the airbag 20. Moreover, this tether 24 has an arc-shaped portion 24C that is provided between the front end of the laterally extending portion 24A and the upper end of the vertically extending portion 24B. As seen in the side view shown in FIG. 1, this arc-shaped portion 24C is formed in the shape of an arc at which the seatback 14 front side is convex, and is set so as to project-out further toward the front side of the seatback 14 than the vertically extending portion 24B.

An upper side communication port 38 (inner vent hole), that communicates the upper portion of the rear bag portion 32 interior and the upper portion of the front bag portion 30 interior with one another in the vertical direction of the airbag 20, is formed in the front end portion of the above-described laterally extending portion 24A. Further, a lower side communication port 40 (inner vent hole), that communicates the lower portion of the rear bag portion 32 interior and the lower portion of the front bag portion 30 interior within one another in the longitudinal direction of the airbag 20, is formed in a vertical direction intermediate portion of the above-described vertically extending portion 24B. In the present embodiment, the opening surface areas of the upper side communication port 38 and the lower side communication port 40 are set to be equal.

On the other hand, as shown in FIG. 1, the inflator 26 is a so-called cylinder type inflator, and is formed in the shape of a cylindrical tube. This inflator 26 is accommodated, together with the flow regulating cloth 28, within the above-described rear bag portion 32. This flow regulating cloth 28 is a member at which a cloth material that is similar to the base cloth of the airbag 20 is sewn into the shape of a tube, and accommodates the inflator 26 at the inner side thereof. The inflator 26 and the flow regulating cloth 28 are disposed at the rear end portion of the rear bag portion 32 interior, in a posture in which the respective axial directions thereof run along the height direction of the seatback 14. In the present embodiment, the diameter of the flow regulating cloth 28 at the respective portions thereof in the axial direction is set to be uniform or substantially uniform, and the opening surface areas of an upper end opening 28A and a lower end opening 28B are set to be equal.

A pair of upper and lower stud bolts (not illustrated) project-out toward the vehicle transverse direction outer side from the outer peripheral portion of the inflator 26. These stud bolts pass-through the base cloth of the airbag 20, the base cloth of the flow regulating cloth 28, and a side frame 15A of a seatback frame 15 that is the skeleton of the seatback 14, and unillustrated nuts are screwed-together with the distal end sides thereof. Due thereto, the inflator 26 is, together with the flow regulating cloth 28 and the airbag 20, fastened and fixed to the seatback frame 15.

As shown in FIG. 1, an ECU 42 (control device) that is installed in the vehicle is electrically connected to this inflator 26. A side collision sensor 44 that senses a side collision of the vehicle is electrically connected to this ECU 42. The ECU 42 and the side collision sensor 44 are structural members of the side airbag device 10 for a vehicle.

The ECU 42 is structured to activate the inflator 26 at the time of sensing (the inevitability of) a side collision of the vehicle on the basis of a signal from the side collision sensor 44. In detail, because the side airbag device 10 for a vehicle relating to the present embodiment is installed in the vehicle seat 12 that is the driver's seat of a right hand drive vehicle, the inflator 26 is activated at the time when the ECU 42 senses that another vehicle has collided with the side portion at the front passenger's seat side (the left side portion) of the vehicle. Note that, in a case in which a pre-crash sensor that forecasts (predicts) a side collision is electrically connected to the ECU 42, there may be a structure in which the inflator 26 is activated at the time when the ECU 42 forecasts a side collision on the basis of a signal from the pre-crash sensor.

When the inflator 26 is activated, gas is jetted-out in a radial form from a gas jetting portion 26A that is provided at one of the upper end portion and the lower end portion (here, the upper end portion) of the inflator 26. The gas that is jetted-out from the gas jetting-out portion 26A is supplied (distributed) (refer to arrows G1, G2 in FIG. 1) to the upper portion and the lower portion of the rear bag portion 32 interior from the upper and lower openings (the upper end opening 28A and the lower end opening 28B) of the flow regulating cloth 28. Moreover, the gas, that has been supplied to the upper portion and the lower portion of the rear bag portion 32 interior, is supplied through the upper side communication port 38 and the lower side communication port 40 that are formed in the tether 24, to the upper portion and the lower portion of the front bag portion 30 interior (refer to arrows G3, G4 in FIG. 1). Due thereto, the airbag 20 inflates and expands toward the front side of the central-side side portion 14A, i.e., the vehicle transverse direction central side with respect to the vehicle occupant P.

In this case, after the gas that has been jetted-out from the inflator 26 is supplied to the rear bag portion 32 interior, the gas is supplied through the upper and lower communication ports 38, 40 to the front bag portion 30 interior, and therefore, the internal pressure of the rear bag portion 32 becomes higher than the internal pressure of the front bag portion 30. Namely, in the present embodiment, an internal pressure adjusting means, that makes the internal pressure of the rear bag portion 32 higher than the internal pressure of the front bag portion 30, is structured due to the inflator 26 being provided within the rear bag portion 32 and the upper and lower communication ports 38, 40 being formed in the tether 24.

In the state in which the airbag 20 has inflated and expanded, the rear portions of the chest portion C and the abdomen portion B, and the shoulder portion S, of the vehicle occupant P are restrained by the rear bag portion 32, and the front portions of the chest portion C and the abdomen portion B, and the head portion H are restrained by the front bag portion 30. In this state, the vertically extending portion 24B of the tether 24 faces, from the vehicle transverse direction inner side, a longitudinal direction intermediate portion of the chest portion C and the abdomen portion B of the vehicle occupant P. Further, due to the arc-shaped portion 24C of the tether 24 projecting-out further toward the front side of the seatback 14 than the vertically extending portion 24B, a shoulder restraining portion 32A that is provided at the upper portion of the rear bag portion 32 projects-out further toward the front side of the seatback 14 than the lower portion of the rear bag portion 32 (here, the region that restrains the rear portions of the chest portion C and the abdomen portion B).

The arc-shaped portion 24C, that structures the front end portion (the front surface) of this shoulder restraining portion 32A, is formed in the shape of an arc at which the seatback 14 front side (the vehicle front side) is convex. The lower portion of this arc-shaped portion 24C, i.e., the region at the tether 24 that partitions the lower portion of the shoulder restraining portion 32A and the front bag portion 30, is an inclined portion 24C1 that is inclined frontwardly and upwardly with respect to the longitudinal direction of the seatback 14. As seen in a side view, this inclined portion 24C1 is set so as to be positioned between the center of the shoulder portion S and the length direction central portion of an upper arm portion A (the position of a center of gravity AG of the upper arm portion A or a position in the vicinity of the center of gravity AG). Note that the aforementioned center of the shoulder portion S is the axial center of a bolt 50 that is provided at the shoulder portion S of the vehicle occupant P, i.e., the dummy P.

Figure 2:
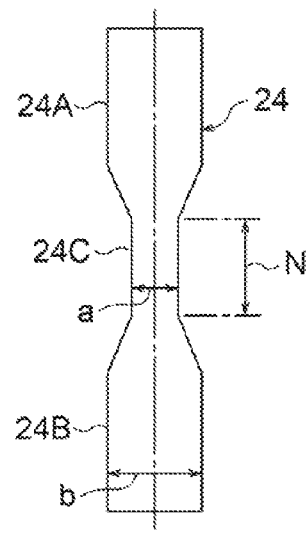
FIG. 2 is a plan development of a tether that is attached to the interior of the airbag.
Figure 3:
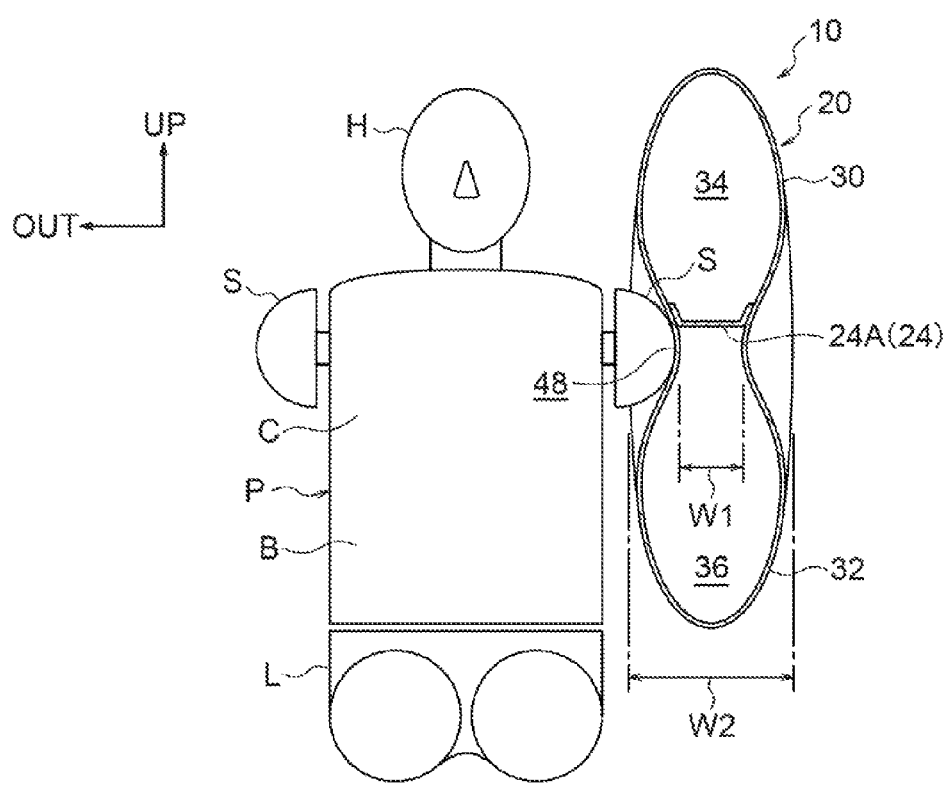
FIG. 3 is a drawing in which a portion of the structure shown in FIG. 1 is reduced and seen from the vehicle front side, and is a partial sectional view showing the cross-section cut along line F3-F3 of FIG. 1 at the airbag.

Further, at the above-described tether 24, at the region that is positioned between the shoulder restraining portion 32A and the front bag portion 30 (the region marked by reference numeral N in FIG. 2), the width dimension is smaller than at the other regions (a<b in FIG. 2). Due thereto, as shown in FIG. 3, there is a structure in which an inflated width W1 of the shoulder restraining portion 32A (the dimension in the vehicle transverse direction in the inflated and expanded state of the airbag 20) is thinner than an inflated width W2 of the regions, that are adjacent to the shoulder restraining portion 32A, of the airbag 20. Further, by making the inflated width W1 of the shoulder restraining portion 32A be thin, a concave portion 48 is formed in a vicinity of the shoulder restraining portion 32A at the vehicle transverse direction outer side surface of the airbag 20.

(Operation and Effects)

Operation and effects of the first embodiment are described next.

At the side airbag device 10 for a vehicle that has the above-described structure, when the ECU 42 senses a side collision on the basis of a signal from the side collision sensor 44, the inflator 26 is activated by this ECU 42. Thereupon, gas is jetted-out into the rear bag portion 32 of the airbag 20 in which this inflator 26 is accommodated, and the gas within the rear bag portion 32 is supplied through the upper and lower communication ports 38, 40 that are formed in the tether 24, to the front bag portion 30 interior. Due thereto, the airbag 20 inflates and expands toward the vehicle front side of the central-side side portion 14A of the seatback 14.

At the time of this inflation and expansion, the rear bag portion 32 that accommodates the inflator 26 inflates and expands earlier than and at a higher pressure than the front bag portion 30. Therefore, the front bag portion 30, that is low pressure and inflates and expands later, can be supported by the rear bag portion 32 that is high pressure. Due thereto, it can be made such that the front bag portion 30 does not shake greatly. Moreover, the flow of gas from the rear bag portion 32 that is high pressure to the front bag portion 30 that is low pressure can be regulated by the upper and lower communication ports 38, 40 that are formed in the tether 24.

Due to the above, the expansion behavior of the front bag portion 30 can be stabilized, and therefore, this can contribute to stabilizing the restraining of the head portion H by the front bag portion 30.

Further, in the present embodiment, the gas that is jetted-out from the inflator 26 is supplied (distributed) from the upper portion and the lower portion of the rear bag portion 32 interior, through the upper side communication port 38 and the lower side communication port 40 of the tether 24, to the upper portion and the lower portion of the front bag portion 30. Moreover, the upper side communication port 38 communicates the upper portion of the rear bag portion 32 interior and the upper portion of the front bag portion 30 interior in the vertical direction of the airbag 20, and the lower side communication port 40 communicates the lower portion of the rear bag portion 32 interior and the lower portion of the front bag portion 30 interior in the longitudinal direction of the airbag 20. Due thereto, the gas (refer to arrow G4 in FIG. 1), that is supplied through the lower side communication port 40 to the lower portion of the front bag portion 30 interior, can be made to not inadvertently interfere with the gas (refer to arrow G3 in FIG. 1) that is supplied through the upper side communication port 38 to the upper portion of the front bag portion 30 interior. As a result, this can contribute more to the effect of stabilizing the expansion behavior of the upper portion of the front bag portion 30 (i.e., the region for restraining the head portion H of the vehicle occupant P).

Moreover, in the present embodiment, the shoulder restraining portion 32A, that is provided at the upper portion of the rear bag portion 32, projects-out further toward the front side of the seatback 14 than the lower portion of the rear bag portion 32 (i.e., the region for restraining the rear portions of the chest portion C and the abdomen portion B of the vehicle occupant P). Due thereto, the shoulder portion S restraining surface area at the rear bag portion 32 that is high pressure can be ensured to be wide, and therefore, this can contribute to improving the shoulder portion S restraining performance.

Further, in the present embodiment, because the width dimension at the tether 24 decreases at the region that is positioned between the shoulder restraining portion 32A and the front bag portion 30, the inflated width W1 of the shoulder restraining portion 32A in the inflated and expanded state of the airbag 20 can be made to be thin. Due thereto, due to the shoulder portion S, at which the body width is largest of the body of the vehicle occupant P, interfering with the shoulder restraining portion 32A first, the entire airbag 20 being displaced (escaping) inadvertently toward the vehicle transverse direction inner side (the side opposite the vehicle occupant P) can be prevented or suppressed.

Figure 4:
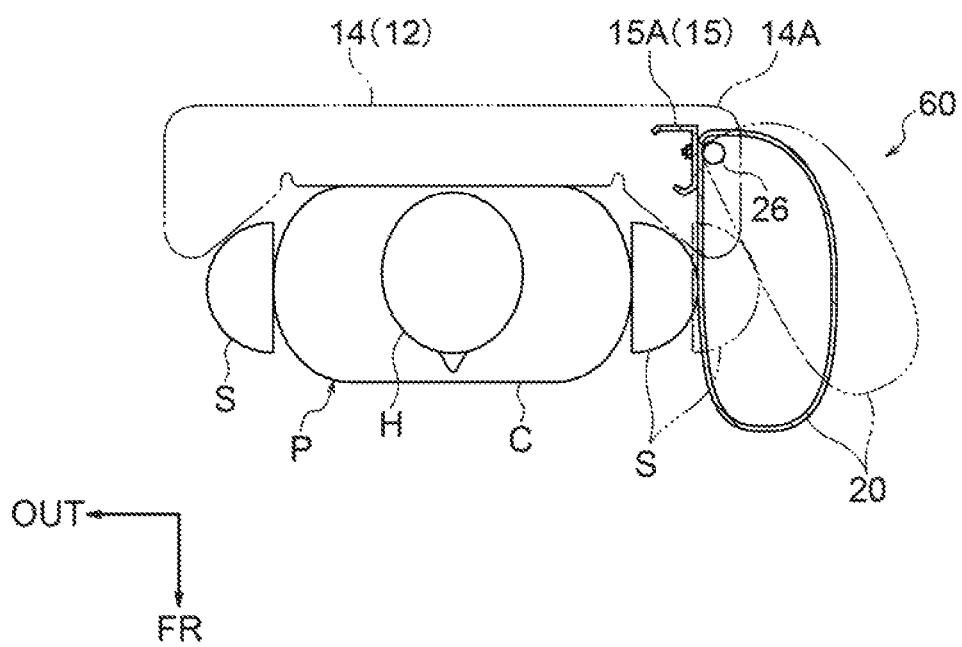
FIG. 4 is a plan sectional view in which a state, in which an airbag has inflated and expanded at a side airbag device for a vehicle relating to a comparative example, is seen from the vehicle upper side.

Namely, as in a comparative example 60 shown in FIG. 4, in a case that is not structured such that the inflated width W1 of the shoulder restraining portion 32A is thin, due to the shoulder portion S interfering with the airbag 20 first as shown by the three-dot chain line in FIG. 4, there is the possibility that the entire airbag 20 will escape toward the vehicle transverse direction inner side. In such a case, at the far side airbag device, cases in which reaction force cannot be applied to the airbag 20 from the side opposite the vehicle occupant P can be envisaged, due to the distance to the adjacent vehicle seat being far, or due to the slid positions of the seat and the adjacent vehicle seat being offset from one another, or the like. As a result, it can be thought that the vehicle occupant restraining performance of the airbag 20 will be affected. However, in the present embodiment, because this can be avoided, it can contribute to an improvement in the vehicle occupant restraining performance of the airbag 20. Note that, in FIG. 4, structures that are similar to those of the present embodiment are denoted by the same reference numerals.

Further, by making the inflated width W1 of the shoulder restraining portion 32A thin as described above, the concave portion 48 (see FIG. 3) is formed in a vicinity of the shoulder restraining portion 32A at the vehicle transverse direction outer side surface of the airbag 20. Because the shoulder portion S can be fit into this concave portion 48, the airbag 20 inadvertently moving longitudinally and vertically with respect to the shoulder portion S can be prevented or suppressed by a simple structure.

Further, in the present embodiment, the gas that is jetted-out from the inflator 26 is distributed to the upper portion and the lower portion of the rear bag portion 32 interior by the flow regulating cloth 28. The gas, that has been distributed to the upper portion of the rear bag portion 32 interior, flows into the shoulder restraining portion 32A from the upper portion side, and flows to the lower portion side of the shoulder restraining portion 32A interior along the arc-shaped front surface of the shoulder restraining portion 32A (refer to arrow G5 in FIG. 1). Because the flow of gas at this time can be made to be fast, this can contribute to the effect of accelerating the inflation and expansion of the shoulder restraining portion 32A.

Other embodiments of the present invention are described next. Note that structures and operation that are basically similar to those of the above-described first embodiment are denoted by the same reference numerals as in the first embodiment, and description thereof is omitted.

<Second Embodiment>
(Structure)

Figure 5:
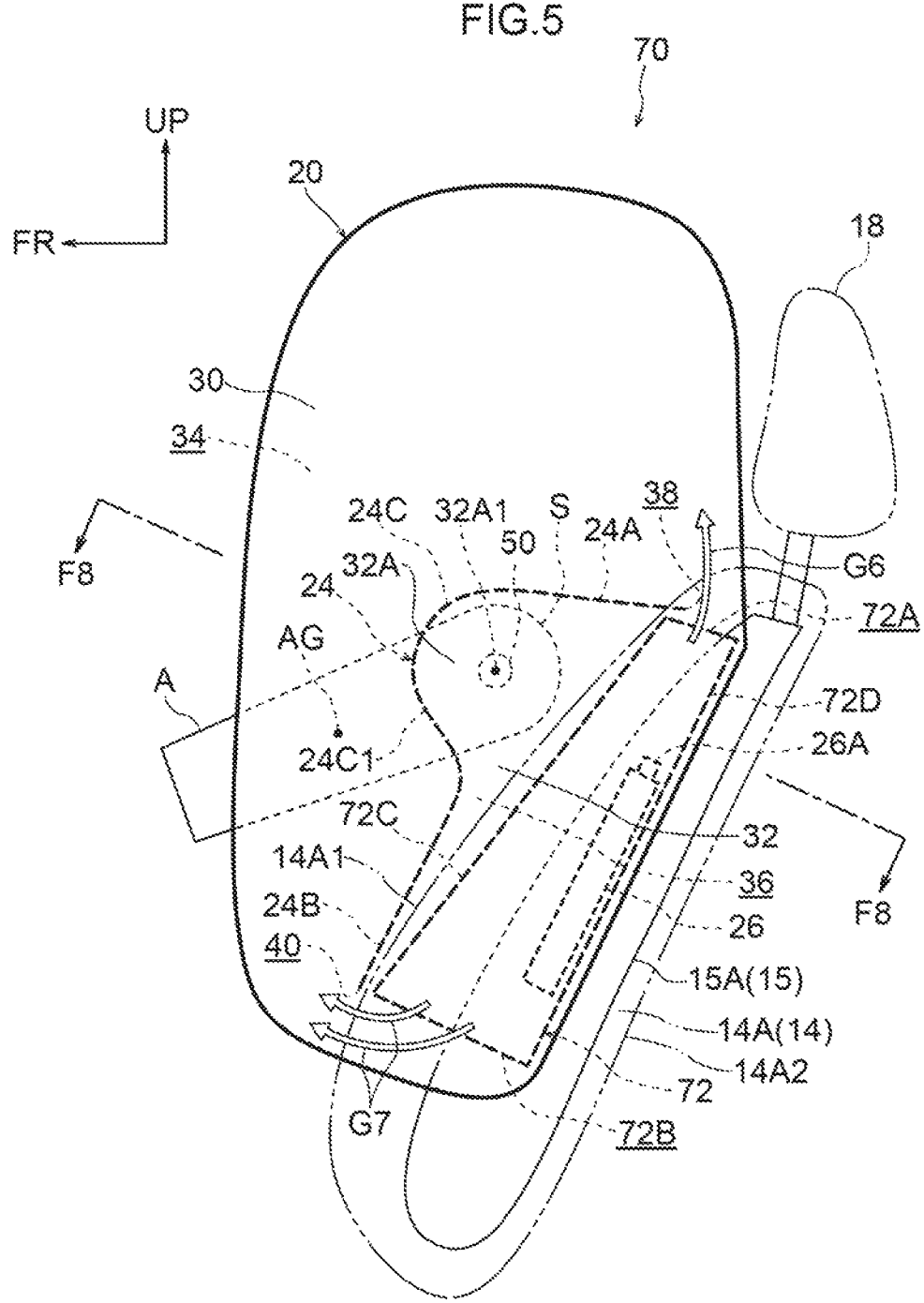
FIG. 5 is a side view showing a state in which the airbag has inflated and expanded in a side airbag device for a vehicle relating to a second embodiment of the present invention.

A state in which the airbag 20 has inflated and expanded at a side airbag device 70 for a vehicle relating to a second embodiment of the present invention, is shown in a side view in FIG. 5. The airbag 20 relating to this embodiment is structured such that the step portion 20B relating to the above-described first embodiment is omitted. Further, in this embodiment, the structure of a flow regulating cloth 72 (a loop diffuser) that is a flow regulating member differs from that of the flow regulating cloth 28 relating to the above-described first embodiment. This flow regulating cloth 72 is formed in a tubular shape from a cloth material in the same way as the flow regulating cloth 28, but is formed such that the diameter thereof increases from an upper end opening 72A toward a lower end opening 72B, and the flow regulating cloth 72 has an outer shape that is substantially truncated cone shaped (see FIG. 5 through FIG. 7).

The opening surface area of the upper end opening 72A is set to be, for example, equal to the opening surface area of the upper end opening 28A and the lower end opening 28B of the flow regulating cloth 28, and the opening surface area of the lower end opening 72B is set to be sufficiently larger than the opening surface area of the upper end opening 72A. Further, the length dimension in the axial direction of this flow regulating cloth 72 is set to be longer than that of the flow regulating cloth 28, and the flow regulating cloth 72 is formed so as to be larger on the whole than the flow regulating cloth 28. This flow regulating cloth 72 is disposed toward the rear end of the airbag 20 at the rear bag portion 32 interior, and extends from a vicinity beneath the upper end of the rear bag portion 32 to slightly further toward the upper end side than the lower end of the rear bag portion 32.

The upper end opening 72A of the flow regulating cloth 72 is set (refer to arrow h in FIG. 6) further toward the upper end side of the rear bag portion 32 (the laterally extending portion 24A side of the tether 24) than a central restraining portion 32A1 (see FIG. 5 and FIG. 6) that is the region for restraining the center of the shoulder portion S of the vehicle occupant P at the shoulder restraining portion 32A. Here, the aforementioned center of the shoulder portion S is the axial center of the bolt 50 that is provided at the shoulder portion S of the dummy P. Further, the above-described central restraining portion 32A1 is a region that faces the center of the shoulder portion S in the inflated and expanded state of the airbag 20, and, when the shoulder restraining portion 32A in the inflated and expanded state is viewed from the side, the central restraining portion 32A1 is set at the center or at the substantial center of the shoulder restraining portion 32A. The aforementioned center of the shoulder restraining portion 32A is set at the center of or at the vicinity of the center of the radius of curvature of the arc-shaped portion 24C for example.

Further, in the present embodiment, the upper side communication port 38 of the tether 24 is formed at the rear end portion of the laterally extending portion 24A, and the lower side communication port 40 of the tether 24 is formed at the lower end portion of the vertically extending portion 24B of the tether 24. The upper side communication port 38 is set so as to face the upper end opening 72A of the flow regulating cloth 72 from the upper side of the airbag 20 (the upper side in FIG. 5 and FIG. 6), and the lower side communication port 40 is set so as to face the lower end opening 72B from the front side of the airbag 20 (the left side in FIG. 5 and FIG. 6). The gap between the upper end opening 72A and the upper side communication port 38 is set to be sufficiently narrower than the gap between the lower end opening 72B and the lower end of the rear bag portion 32. Note that the opening surface areas of the upper side communication port 38 and the lower side communication port 40 are set to be equal in the same way as in the above-described first embodiment, but the present embodiment is not limited to this, and the opening surface areas of the upper side communication port 38 and the lower side communication port 40 can be changed appropriately.

The inflator 26 is accommodated at the inner side of the flow regulating cloth 72 that has the above-described structure, and the flow regulating cloth 72 and the airbag 20 are fixed to the side frame 15A by using the stud bolts of the inflator 26. In the same way as in the above-described first embodiment, the flow regulating cloth 72 and the airbag 20 are accommodated within the central-side side portion 14A in the folded-up state.

Figure 6:
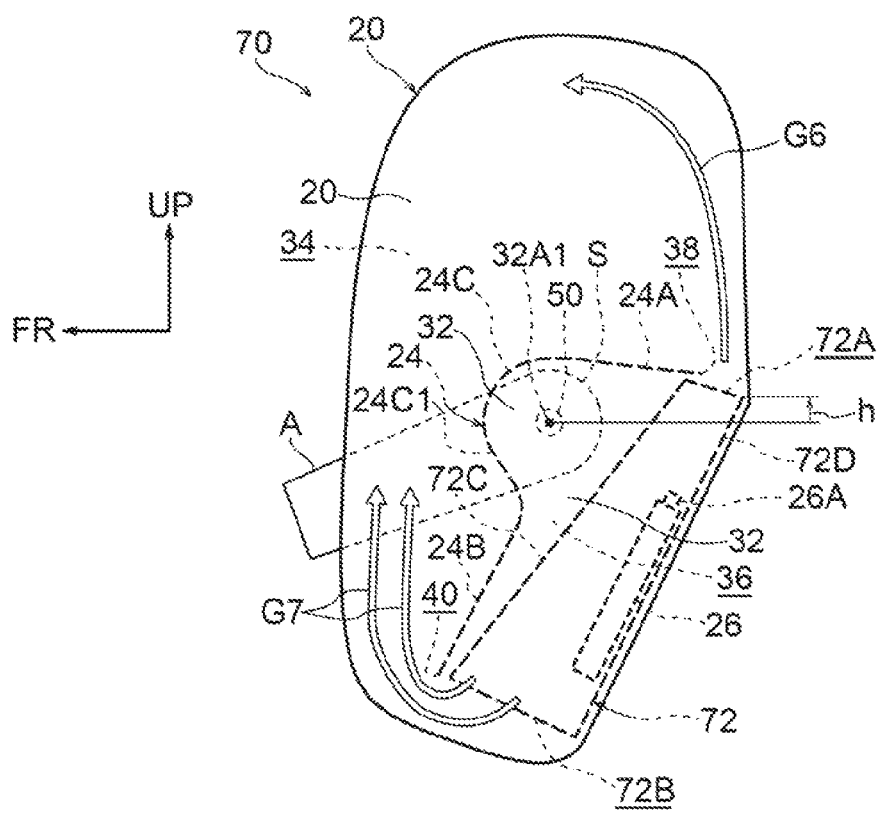
FIG. 6 is a side view showing a portion of FIG. 5 in a reduced manner, and is a drawing for explaining the height of an upper end opening of a flow regulating cloth, and a flow of gas that is supplied to a front bag portion interior.
Figure 7:
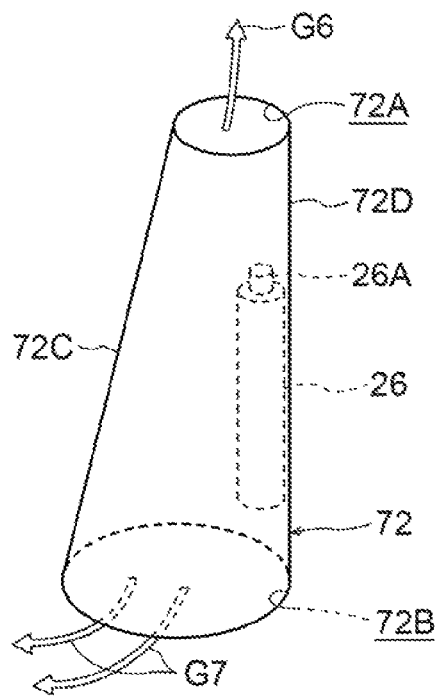
FIG. 7 is a perspective view of the flow regulating cloth.
Figure 8:
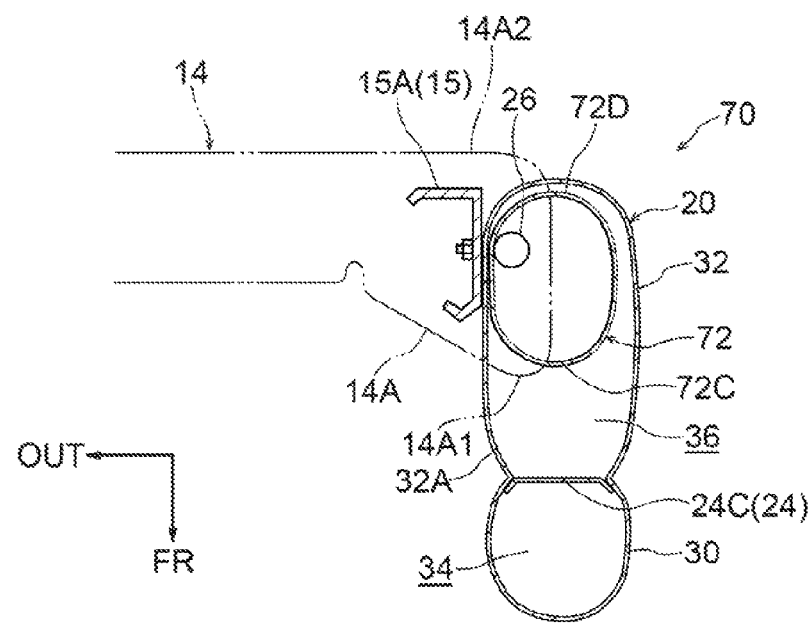
FIG. 8 is a cross-sectional view showing the cross-section cut along line F8-F8 of FIG. 5.

When the inflator 26 activates, gas is jetted-out in a radial form from the gas jetting-out portion 26A of the inflator 26, and the flow regulating cloth 72 inflates and expands due to the pressure of this gas (the state shown in FIG. 5 and FIG. 6). As shown in FIG. 5 and FIG. 6, the shape of the flow regulating cloth 72 in the inflated and expanded state is set so as to form a substantially trapezoidal shape that is similar to the outer shape, as seen in side view, of the region (the area) at the central-side side portion 14A where the flow regulating cloth 72 is disposed. Concretely, the shape of the flow regulating cloth 72 in the inflated and expanded shape is set such that a front surface 72C runs along a front surface 14A1 of the central-side side portion 14A, and a rear surface 72D runs along a rear surface 14A2 of the central-side side portion 14A, and the flow regulating cloth 72 is disposed so as to be positioned toward the front of the seatback 14 within the central-side side portion 14A.

Note that a state, that is before the seatback pad and the seat skin that structure the central-side side portion 14A receive the inflation pressure of the airbag 20 and are ruptured, is shown by the two-dot chain line in FIG. 5 and FIG. 6. In the present embodiment, the front surface 72C of the flow regulating cloth 72 in the inflated and expanded state is set so as to be positioned slightly further toward the rear side of the seatback 14 than the front surface 14A1 of the central-side side portion 14A in the above-described state before rupturing. Due thereto, there is a structure in which, even in the state in which the seatback pad and the seat skin that structure the central-side side portion 14A receive the inflation pressure of the airbag 20 and are ruptured, the flow regulating cloth 72 does not project-out further toward the front side of the seatback 14 than the front end portion of the central-side side portion 14A.

The gas, that has been jetted-out into the above-described flow regulating cloth 72, is distributed from the upper end opening 72A and the lower end opening 72B of this flow regulating cloth 72 to the upper portion and the lower portion of the rear bag portion 32 interior, and the rear bag portion 32 inflates and expands. In this case, because the flow regulating cloth 72 is formed such that the diameter thereof increases from the upper end opening 72A toward the lower end opening 72B, the flow rate of the gas that is jetted-out from the lower end opening 72B is greater than the flow rate of the gas that is jetted-out from the upper end opening 72A (refer to arrow G6 and arrows G7 in FIG. 7).

The gas, that has been distributed (jetted-out) from the upper end opening 72A and the lower end opening 72B to the upper portion and the lower portion of the rear bag portion 32 interior, is supplied through the upper side communication port 38 and the lower side communication port 40 to the upper portion and the lower portion of the front bag portion 30 (refer to arrow G6 and arrows G7 in FIG. 5). Due thereto, the front bag portion 30 inflates and expands later than the rear bag portion 32. Note that some of the gas, that has been jetted-out from the upper end opening 72A and the lower end opening 72B into the upper portion and the lower portion of the rear bag portion 32 interior, gathers within the rear bag portion 32 and raises the internal pressure of the rear bag portion 32 interior. Due thereto, the rear bag portion 32 becomes high pressure earlier than the front bag portion 30. In this embodiment, structures other than those described above are similar to those of the above-described first embodiment.

(Operation and Effects)

In the side airbag device 70 for a vehicle of the above-described structure, gas that is generated from the inflator 26 is distributed from the upper end opening 72A and the lower end opening 72B of the flow regulating cloth 72, that is provided within the rear bag portion 32, to the upper portion and the lower portion of the rear bag portion 32 interior. Because this flow regulating cloth 72 is formed in a tubular shape whose diameter increases from the upper end opening 72A toward the lower end opening 72B, a larger amount of gas can be distributed to the lower portion of the rear bag portion 32 interior than the upper portion. As a result, the flow rate of the gas (refer to arrows G7 in FIG. 5), that is supplied from the lower portion of the rear bag portion 32 interior through the lower side communication port 40 of the tether 24 to the lower portion of the front bag portion 30 interior, increases, whereas the flow rate of the gas (refer to arrow G6 in FIG. 5), that is supplied from the upper portion of the rear bag portion 32 interior through the upper side communication port 38 of the tether 24 to the upper portion of the front bag portion 30 interior, decreases.

Some of the gas, that has been supplied more to the lower portion of the front bag portion 30 interior, flows also to the upper portion of the front bag portion 30 interior. Therefore, gas is supplied to the upper portion of the front bag portion 30 interior by two paths that are the path (refer to arrow G6 in FIG. 6) from the upper side communication port 38 and the path (refer to arrows G7 in FIG. 6) from the lower portion of the front bag portion 30 interior. Further, by making the flow rates of the gases that are supplied by these two flow paths be well-balanced, the front bag portion 30 can be inflated and expanded stably from the lower side to the upper side (the arrow UP direction in FIG. 6). As a result, the expansion behavior of the front bag portion 30 can be stabilized more, and therefore, this can contribute more to the effect of stabilizing the restraining of the head portion H by the front bag portion 30.

Further, in the present embodiment, the upper side communication port 38 of the tether 24 is set so as to face the upper end opening 72A of the flow regulating cloth 72, and the lower side communication port 40 of the tether 24 is set so as to face the lower end opening 72B of the flow regulating cloth 72. Due thereto, the gas, that has been distributed from the upper end opening 72A and the lower end opening 72B to the upper portion and the lower portion of the rear bag portion 32 interior, can be supplied, through the upper side communication port 38 and the lower side communication port 40, smoothly to the upper portion and the lower portion of the front bag portion 30 interior.

Moreover, in the present embodiment, the upper end opening 72A of the flow regulating cloth 72 is set further toward the upper end side of the rear bag portion 32 (i.e., the laterally extending portion 24A side) than the central restraining portion 32A1 that is the region for restraining the center of the shoulder portion S of the vehicle occupant P at the shoulder restraining portion 32A. Further, at the laterally extending portion 24A, the upper side communication port 38 is set so as to face the upper end opening 72A of the flow regulating cloth 72. Therefore, the gas, that is distributed (jetted-out) to the upper portion of the rear bag portion 32 interior from the upper end opening 72A at the time of operation of the inflator 26, is supplied prioritarily through the upper side communication port 38 to the upper portion of the front bag portion 30 interior, and not into the shoulder restraining portion 32A. Due thereto, it is possible to make it such that the shoulder restraining portion 32A does not become too high pressure in the initial stage of inflation and expansion. As a result, for example, even in a case in which the shoulder restraining portion 32A inflates and expands in a state in which the head portion of a child, or the like, exists at an improper position (out of position) that is the inflation and expansion region of the shoulder restraining portion 32A, the load applied to the head portion of the child, or the like, can be lessened, and therefore, the so-called OOP performance can be improved.

Further, as described above, the gas can be prioritarily supplied to the upper portion of the front bag portion 30 interior rather than to the shoulder restraining portion 32A, and the flow rate of the gas, that is supplied through the lower side communication port 40 to the lower portion of the front bag portion 30 interior, can be increased. Therefore, the front bag portion 30 can be inflated and expanded rapidly (the inflation and expansion of the front bag portion 30 can be made to be earlier).

Moreover, in the present embodiment, the shape of the flow regulating cloth 72, that has been inflated and expanded by the jetting-out of gas of the inflator 26, is set so as to form a substantially trapezoidal shape that is similar to the outer shape, as seen in side view, of the region at the central-side side portion 14A where the flow regulating cloth 72 is disposed. Due thereto, the flow regulating cloth 72 that has inflated and expanded is structured so as to not project-out further toward the front side of the seatback 14 than the front end portion of the central-side side portion 14A. Therefore, for example, even in a case in which the flow regulating cloth 72 inflates and expands in a state in which the head portion of a child, or the like, exists at an improper position in front of the central-side side portion 14A, it can be made such that the head portion of the child, or the like, does not receive load from the flow regulating cloth 72 that is high pressure. Accordingly, for this reason as well, the OOP performance can be improved.

Note that the front surface 72C side of the above-described flow regulating cloth 72 that has inflated and expanded may be structured so as to project-out slightly toward the front side of the seatback 14 from the front end portion of the central-side side portion 14A. In this case as well, the OOP performance can be made to be good due to the front surface 72C of the flow regulating cloth 72, that has inflated and expanded, running along the front end portion of the central-side side portion 14A.

<Third Embodiment>
(Structure)

Figure 9:
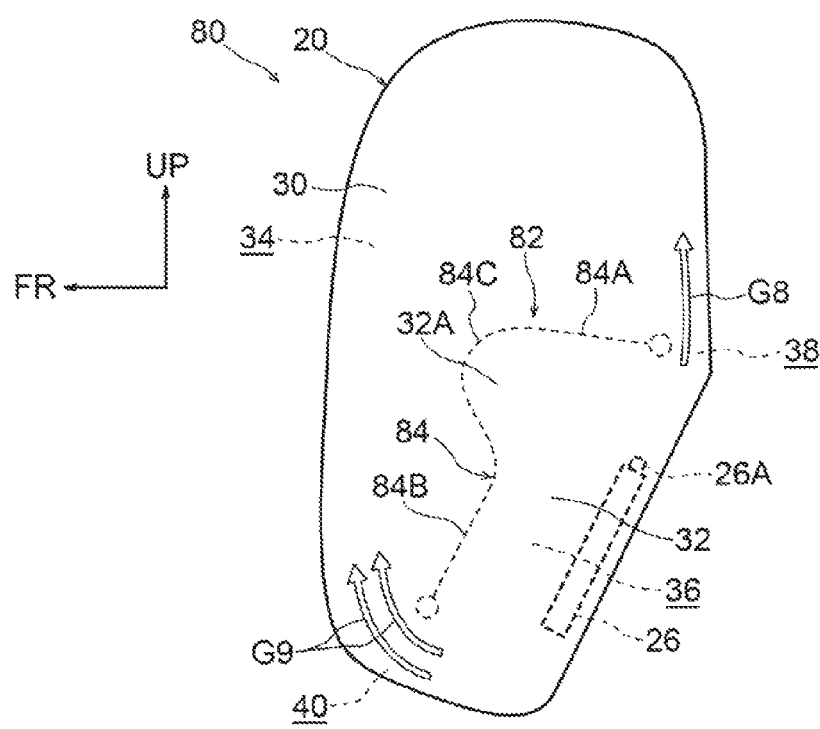
FIG. 9 is a side view showing a state in which the airbag has inflated and expanded in a side airbag device for a vehicle relating to a third embodiment of the present invention.

A state in which the airbag 20 has inflated and expanded at a side airbag device 80 for a vehicle relating to a third embodiment of the present invention, is shown in a side view in FIG. 9. In this embodiment, the flow regulating cloth 72 relating to the above-described first embodiment is omitted. Further, in this embodiment, the structure of a partitioning portion 82 differs from that of the above-described first embodiment. This partitioning portion 82 partitions the airbag 20 into the front bag portion 30 and the rear bag portion 32 by a sewn portion (seam) 84 at which one side portion and the other side portion of the base cloth of the airbag 20 are sewn.

The above-described sewn portion 84 has a laterally extending portion 84A, a vertically extending portion 84B and an arc-shaped portion 84C that are set at the airbag 20 at similar positions as the laterally extending portion 24A, the vertically extending portion 24B and the arc-shaped portion 24C of the tether 24 relating to the above-described first embodiment. However, the rear end of the laterally extending portion 84A does not reach the rear end of the airbag 20, and the sewn portion 84 is partially omitted between the rear end of the laterally extending portion 84A and the rear end of the airbag 20. Further, the upper side communication port 38 is formed at the place where this sewn portion 84 is partially omitted (the unsewn portion). Further, the lower end of the vertically extending portion 84B does not reach the lower end of the airbag 20, and the sewn portion 84 is partially omitted between the lower end of the vertically extending portion 84B and the lower end of the airbag 20. Further, the lower side communication port 40 is formed at the place where this sewn portion 84 is partially omitted (the unsewn portion). Note that final end processing is carried out on the rear end of the laterally extending portion 84A and the lower end of the vertically extending portion 84B by sewing in circular shapes, respectively.

The above-described upper side communication port 38 and lower side communication port 40 are set at positions that are similar to the above-described second embodiment. However, in this embodiment, the opening surface area of the lower side communication port 40 is set to be larger than the opening surface area of the upper side communication port 38. Structures other than those described above are similar to those of the above-described first embodiment.

(Operation and Effects)

In this embodiment, the gas, that the inflator 26 has generated within the rear bag portion 32, is supplied through the upper side communication port 38 and the lower side communication port 48 of the partitioning portion 82, to the upper portion and the lower portion of the front bag portion 30. The opening surface area of the lower side communication port 40 is set to be larger than the opening surface area of the upper side communication port 38. Therefore, the flow rate of the gas (refer to arrows G9 in FIG. 9), that is supplied from the lower portion of the rear bag portion 32 interior through the lower side communication port 40 to the lower portion of the front bag portion 30 interior, increases, whereas the flow rate of the gas (refer to arrow G8 in FIG. 9), that is supplied from the upper portion of the rear bag portion interior through the upper side communication port 38 to the upper portion of the front bag portion 30 interior, decreases.

Some of the gas, that has been supplied more to the lower portion of the front bag portion 30 interior, flows also to the upper portion of the front bag portion 30 interior. Therefore, gas is supplied to the upper portion of the front bag portion 30 interior by two paths that are the path (refer to arrow G8 in FIG. 9) from the upper side communication port 38 and the path (refer to arrows G9 in FIG. 9) from the lower portion of the front bag portion 30 interior. Further, by making the flow rates of the gases that are supplied by these two flow paths be well-balanced, the front bag portion 30 can be inflated and expanded stably from the lower side to the upper side (the arrow UP direction in FIG. 9). As a result, the expansion behavior of the front bag portion 30 can be stabilized more, and therefore, this can contribute more to the effect of stabilizing the restraining of the head portion H by the front bag portion 30.

Moreover, in this embodiment, the airbag 20 is partitioned into the front bag portion 30 and the rear bag portion 32 by the sewn portion 84 at which the base cloth of the airbag 20 is sewn. Further, the upper side communication port 38 and the lower side communication port 40 are formed due to this sewn portion 84 being partially omitted between the front bag portion 30 and the rear bag portion 32. Due thereto, the partitioning portion 82 can be made to be a simple structure, and therefore, this contributes to a reduction in the manufacturing cost. Further, in this embodiment, because the flow regulating cloth (flow regulating member) is omitted, this contributes to a reduction in the manufacturing cost due thereto as well.

Figure 10:
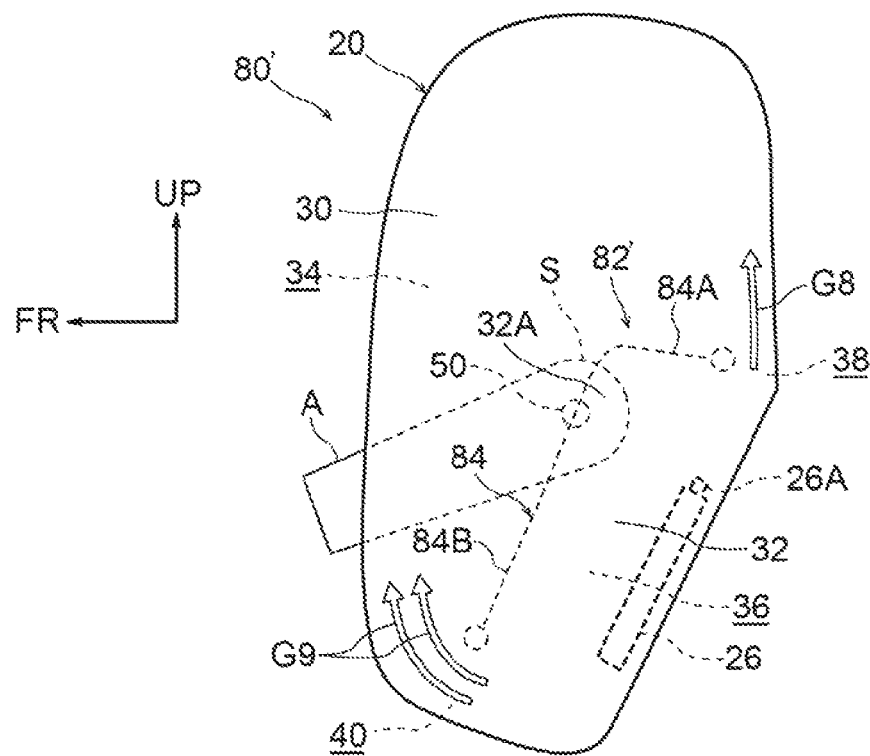
FIG. 10 is a side view showing an inflated and expanded state of a modified example of the airbag relating to the third embodiment.

Note that, although the above-described third embodiment is structured such that the sewn portion 84 of the partitioning portion 82 has the arc-shaped portion 84C, the present invention is not limited to this and may be a structure in which a partitioning portion 82' does not have the arc-shaped portion 84C, like a side airbag device 80' for a vehicle shown in FIG. 10 (a modified example). In this modified example, the vertically extending portion 84B extends to the upper end side of the airbag 20, and the upper end of the vertically extending portion 84B and the front end of the laterally extending portion 84A are connected integrally. Therefore, in this modified example, the shoulder restraining portion 32A does not project-out further toward the front side of the seatback 14 than the lower portion of the rear bag portion 32 (the region for restraining the rear portions of the chest portion and the abdomen portion), and there is a structure in which only the rear half portion of the shoulder portion S of the vehicle occupant P is restrained by the shoulder restraining portion 32A. Structures other than those described above are similar to those of the above-described third embodiment.

In this modified example, the rear bag portion 32 that is high pressure does not project-out greatly toward the front side of the seatback 14 from the front end portion of the central-side side portion 14A. Therefore, even in a case in which the rear bag portion 32 inflates and expands in a state in which, for example, the head portion of a child, or the like, exists at an improper position in front of the central-side side portion 14A, the load applied to the head portion of the child, or the like, can be lessened. Note that, the above-described first and second embodiments, and also the fourth through sixth embodiments that are described hereafter, may be structures in which the shoulder restraining portion 32A is set to be small in the same way as in the above-described modified example. Further, it suffices for the shoulder restraining portion 32A to be a portion that restrains at least a portion of the shoulder portion S.

<Fourth Embodiment>
(Structure)

Figure 11:
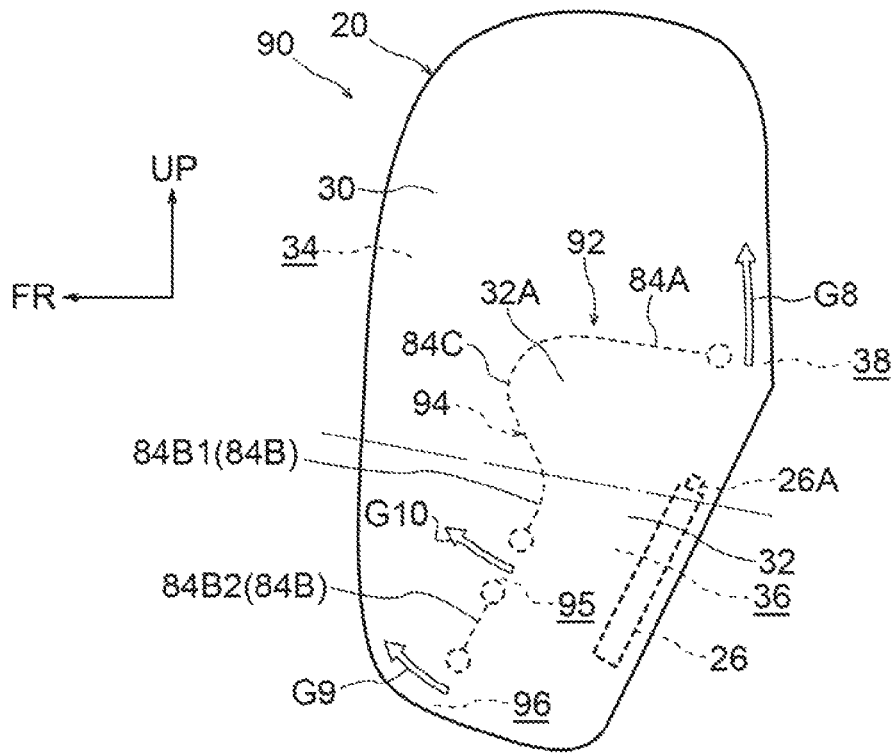
FIG. 11 is a side view showing a state in which the airbag has inflated and expanded in a side airbag device for a vehicle relating to a fourth embodiment of the present invention.

A state in which the airbag 20 has inflated and expanded at a side airbag device 90 for a vehicle relating to a fourth embodiment of the present invention, is shown in a side view in FIG. 11. This embodiment has a structure that is similar to the above-described third embodiment, but the structure of a partitioning portion 92 is different from the partitioning portion 82 relating to the above-described third embodiment. At this partitioning portion 92, a sewn portion 94 has the laterally extending portion 84A, the vertically extending portion 84B and the arc-shaped portion 84C that are similar to the sewn portion 84 relating to the above-described third embodiment, but the vertically extending portion 84B of the sewn portion 84 is divided into an upper portion 84B1 and a lower portion 84B2. A first lower side communication port 95 is formed between the lower end of the upper portion 84B1 and the upper end of the lower portion 84B2, and a second lower side communication port 96 is formed between the lower end of the lower portion 84B2 and the lower end of the airbag 20. Note that final end processing is carried out on the lower end of the upper portion 84B1 and on the upper and lower both ends of the lower portion 84B2 by sewing in circular shapes, respectively.

The first and second lower side communication ports 95, 96 are formed by the sewn portion 84 being omitted between the lower end of the upper portion 84B1 and the upper end of the lower portion 84B2, and between the lower end of the lower portion 84B2 and the lower end of the airbag 20. Lower side communication ports are structured by these first and second lower side communication ports 95, 96. These first and second lower side communication ports 95, 96 are positioned further toward the lower end side of the airbag 20 than the shoulder restraining portion 32A (further toward the lower side than the one-dot chain line in FIG. 11). Further, the total of the respective opening surface areas of the first and second lower side communication ports 95, 96 is set to be greater than the opening surface area of the upper side communication port 38. Structures other than those described above are similar to those of the above-described third embodiment.

(Operation and Effects)

Because this embodiment is structured as described above, the flow rate of the gas (refer to arrows G9, G10 in FIG. 11), that is supplied from the lower portion of the rear bag portion 32 interior through the first and second lower side communication ports 95, 96 to the lower portion of the front bag portion 30 interior, increases, whereas the flow rate of the gas (refer to arrow G8 in FIG. 11), that is supplied from the upper portion of the rear bag portion 32 interior through the upper side communication port 38 to the upper portion of the front bag portion 30 interior, decreases. Accordingly, operation and effects that are similar to those of the above-described third embodiment can be obtained.

Moreover, the gas, that has been supplied to the lower portion of the rear bag portion 32 interior, is supplied through the respective first and second lower side communication ports 95, 96 to the lower portion of the front bag portion 30 interior. Therefore, the flow regulating effect of the gas that is supplied to the lower portion of the front bag portion 30 interior improves, and gas can be supplied smoothly to the lower portion of the front bag portion 30. Due thereto, this can contribute more to the effect of stabilizing the expansion behavior of the front bag portion 30.

<Fifth Embodiment>
(Structure)

Figure 12:
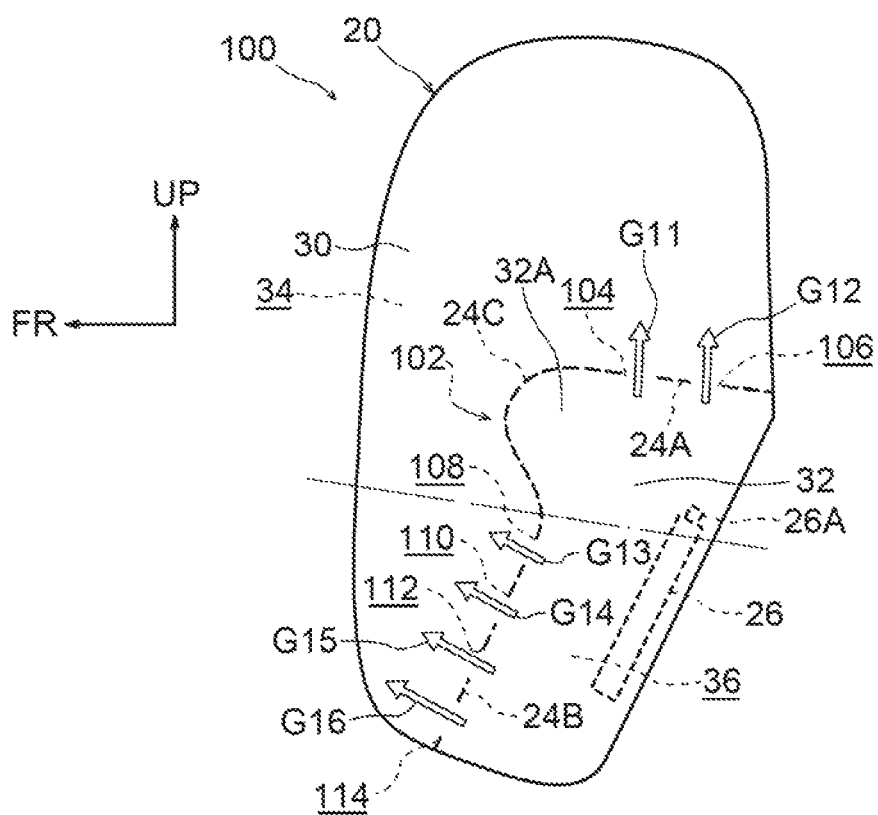
FIG. 12 is a side view showing a state in which the airbag has inflated and expanded in a side airbag device for a vehicle relating to a fifth embodiment of the present invention.

A state in which the airbag 20 has inflated and expanded at a side airbag device 100 for a vehicle relating to a fifth embodiment of the present invention, is shown in a side view in FIG. 12. In this embodiment, the point that the flow regulating cloth 28 is omitted, and the structure of a tether 102 that serves as the partitioning portion, differ from the above-described first embodiment. This tether 102 has the laterally extending portion 24A, the vertically extending portion 24B and the arc-shaped portion 24C that are similar to the tether 24 relating to the above-described first embodiment. A first upper side communication port 104, a second upper side communication port 106, a first lower side communication port 108, a second lower side communication port 110, a third lower side communication port 112 and a fourth lower side communication port 114 are formed in this tether 102 instead of the upper side communication port 38 and the lower side communication port 40 relating to the above-described first embodiment.

The first and second upper side communication ports 104, 106 structure upper side communication ports, and are formed in the laterally extending portion 24A of the tether 102 so as to be lined-up in the longitudinal direction of the airbag 20. The first through fourth lower side communication ports 108, 110, 112, 114 structure lower side communication ports, and are formed in the vertically extending portion 24B of the tether 102 so as to be lined-up in the vertical direction of the airbag 20, further toward the lower end side of the airbag 20 than the shoulder restraining portion 32A (further toward the lower side than the one-dot chain line in FIG. 12). Further, the total of the respective opening surface areas of the first through fourth lower side communication ports 108, 110, 112, 114 is set to be greater than the total of the respective opening surface areas of the first and second upper side communication ports 104, 106.

Further, in the present embodiment, the first through fourth lower side communication ports 108, 110, 112, 114 are formed such that the opening surface area becomes greater from the first lower side communication port 108, that is positioned furthest toward the upper side, toward the fourth lower side communication port 114, that is positioned furthest toward the lower side. Note that there may be a structure in which, by eliminating one of the third and the fourth lower side communication ports 112, 114 and enlarging the opening surface area of the other, an opening surface area, that is equivalent to the total of the respective opening surface areas of the third and fourth lower side communication ports 112, 114, is ensured by the aforementioned other.

(Operation and Effects)

Because this embodiment is structured as described above, the flow rate of the gas (refer to arrows G13 through G16 in FIG. 12), that is supplied from the lower portion of the rear bag portion 32 interior through the first through fourth lower side communication ports 108, 110, 112, 114 to the lower portion of the front bag portion 30 interior, increases, whereas the flow rate of the gas (refer to arrows G11, G12 in FIG. 12), that is supplied from the upper portion of the rear bag portion 32 interior through the first and second upper side communication ports 104, 106 to the upper portion of the front bag portion 30 interior, decreases. Accordingly, operation and effects that are similar to those of the above-described third embodiment can be obtained.

Moreover, the gas, that has been supplied to the upper portion of the rear bag portion 32 interior, is supplied through the respective first and second upper side communication ports 104, 106 to the upper portion of the front bag portion 30 interior. Therefore, the flow regulating effect of the gas that is supplied to the upper portion of the front bag portion 30 interior improves, and gas can be supplied smoothly to the upper portion of the front bag portion 30. Similarly, the gas, that has been supplied to the lower portion of the rear bag portion 32 interior, is supplied through the respective first through fourth lower side communication ports 108, 110, 112, 114 to the lower portion of the front bag portion 30 interior. Therefore, the flow regulating effect of the gas that is supplied to the lower portion of the front bag portion 30 interior improves, and gas can be supplied smoothly to the lower portion of the front bag portion 30. Due thereto, this can contribute more to the effect of stabilizing the expansion behavior of the front bag portion 30.

<Sixth Embodiment>

(Structure)

Figure 13:
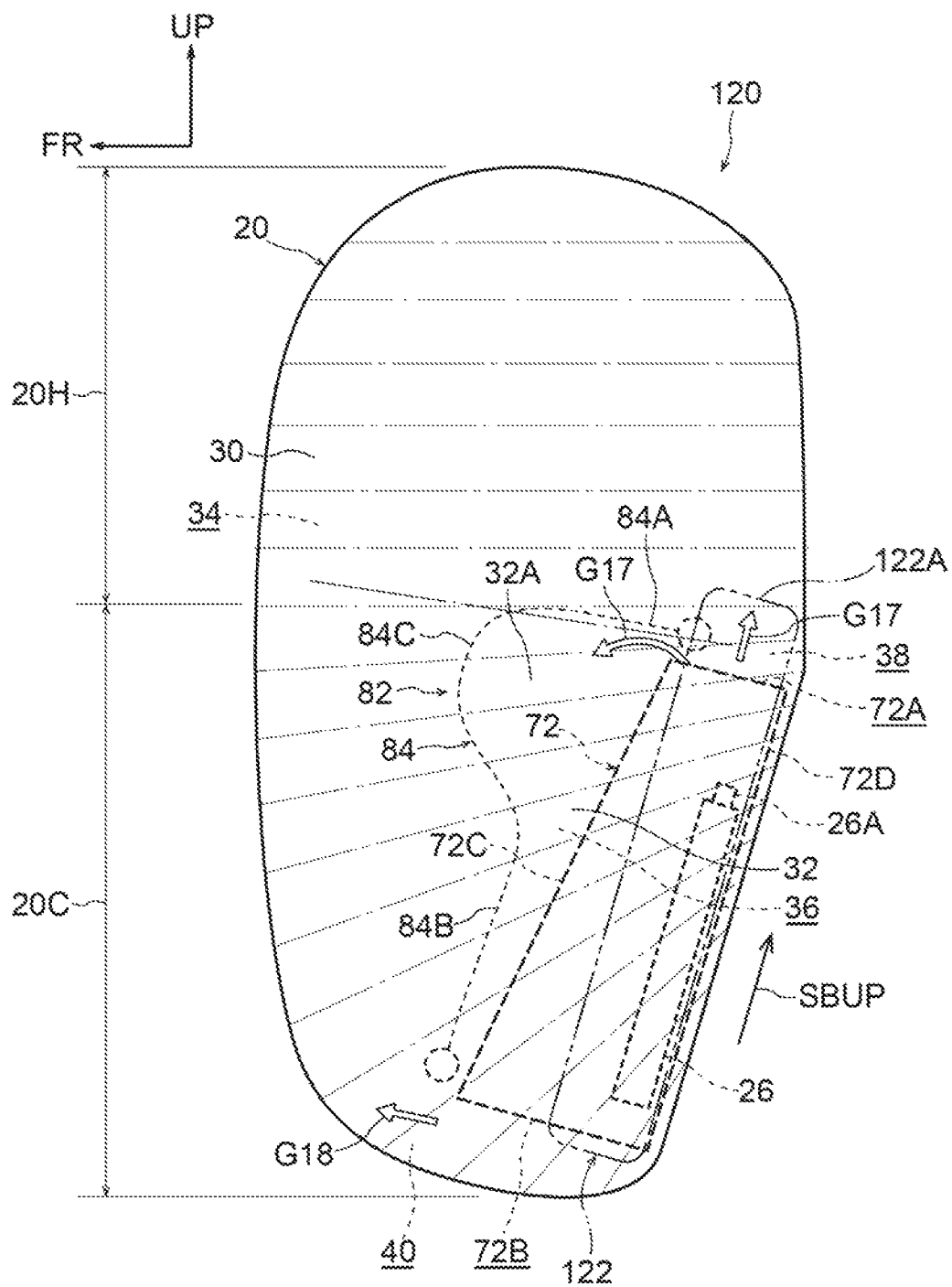
FIG. 13 is a side view showing a state in which the airbag has inflated and expanded in a side airbag device for a vehicle relating to a sixth embodiment of the present invention.

A state in which the airbag 20 has inflated and expanded at a side airbag device 120 for a vehicle relating to a sixth embodiment of the present invention, is shown in a side view in FIG. 13. In this embodiment, the airbag 20 is partitioned into the front bag portion 30 and the rear bag portion 32 by the partitioning portion 82 that is similar to the partitioning portion 82 relating to the above-described third embodiment, and the flow regulating cloth 72, that is similar to the flow regulating cloth 72 relating to the above-described second embodiment, is provided within the rear bag portion 32.

Figure 14A:
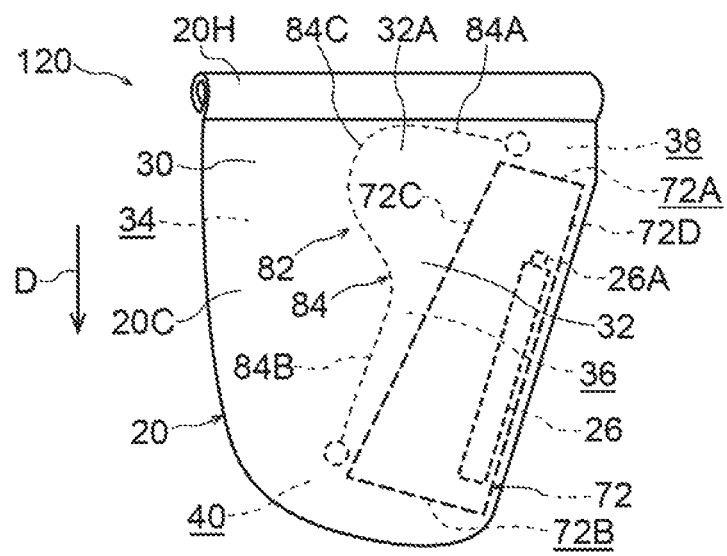
FIG. 14A is a side view showing a state in which a head restraining region of the airbag relating to the sixth embodiment is folded-up.

Further, in this embodiment, there is a structure in which the airbag 20 is folded-up by the following way of folding-up. Namely, at the airbag 20, in the state in which the inflator 26 and the flow regulating cloth 72 are accommodated within the rear bag portion 32, a head restraining region 20H that is further toward the upper side than the partitioning portion 82 is folded-up by roll-folding toward the lower side of the airbag 20 (in the arrow D direction in FIG. 14A), as shown in FIG. 14A. In this case, the aforementioned roll-folding is inward roll-folding in which the vehicle occupant side of the airbag 20 (the side that faces the vehicle occupant P in the inflated and expanded state) is made to be at the inner side.

Figure 14B:
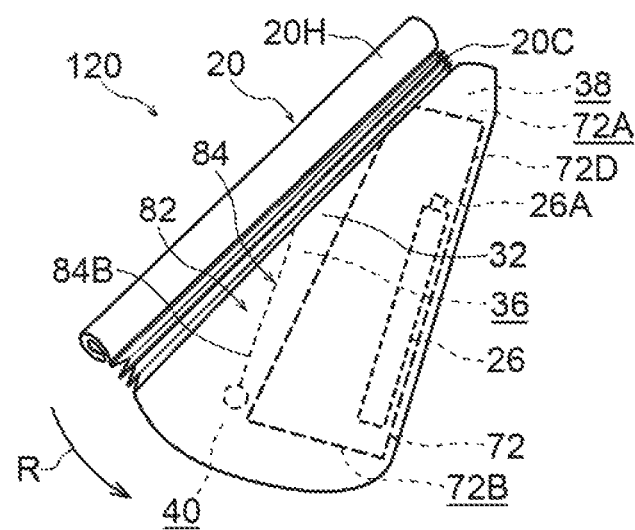
FIG. 14B is a side view showing a state in the midst of folding-up a chest restraining region of the airbag.

Moreover, at the airbag 20, a chest/abdomen restraining region 20C that is further toward the lower side than the head restraining region 20H is folded-up by bellows-folding toward the lower side of the airbag 20 and the rear side of the airbag 20 (in the arrow R direction in FIG. 14B). Note that a state in the midst of folding-up the chest/abdomen restraining region 20C is shown in FIG. 14B. Further, in FIG. 13, plural one-dot chain lines are marked on the airbag 20 in order to make it easy to envisage the directions of the above-described inward roll-folding and bellows-folding.

Figure 14C:
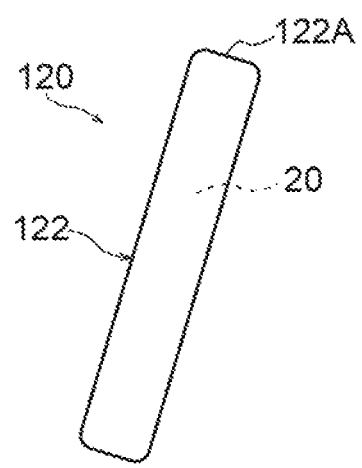
FIG. 14C is a side view showing a state in which folding-up of the airbag has been completed.

The airbag 20, that is folded-up as described above, is enveloped in a wrapping material that ruptures easily due to the inflation pressure of this airbag 20, and is made into a package 122 that is elongated such as shown in FIG. 14C. In a state in which the length direction of this package 122, i.e., the airbag 20 in the folded-up state, is directed in the vertical direction of the seatback 14, the package 122 is accommodated within the central-side side portion 14A, and is fastened and fixed to the side frame 15A by using the stud bolts of the inflator 26.

Moreover, in the present embodiment, there is a structure in which an upper end 122A of the package 122, that is accommodated within the central-side side portion 14A (refer to the two-dot chain line in FIG. 13), is positioned further toward the upper end side of the seatback 14 (the arrow SBUP direction side in FIG. 13) than the upper side communication port 38 in the inflated and expanded state of the airbag 20. Further, in the present embodiment, in the same way as in the above-described second embodiment, there is a structure in which, in the inflated and expanded state of the airbag 20, the upper side communication port 38 is positioned further toward the upper end side of the seatback 14 than the upper end opening 72A of the flow regulating cloth 72. In the same way as in the above-described second embodiment, this upper side communication port 38 is set so as to face the upper end opening 72A from the upper side of the airbag 20.

Note that, in the present embodiment, as described above, there is a structure in which the head restraining region 20H is folded-up by inward roll-folding, and the chest/abdomen restraining region 20C is folded-up by bellows-folding, but the present invention is not limited to this. Namely, for example, there may be a structure in which both the head restraining region 20H and the chest/abdomen restraining region 20C are folded-up by inward roll-folding. Further, for example, there may be a structure in which both the head restraining region 20H and the chest/abdomen restraining region 20C are folded-up by bellows-folding.

(Operation and Effects)

In the present embodiment, at the airbag 20, the head restraining region 20H, that is further toward the upper side than the partitioning portion 82, is folded-up by inward roll-folding toward the lower side of the airbag 20. Moreover, at this airbag 20, the chest/abdomen restraining region 20C, that is further toward the lower side than the head restraining region 20H, is folded-up by bellows-folding toward the lower side of the airbag 20 and the rear side of the airbag 20. Due thereto, the airbag 20 is set in a state in which it easily inflates and expands stably from the lower side toward the upper side.

Further, in the present embodiment, the airbag 20 that is folded-up as described above is enveloped in a wrapping material and made into the package 122, and is accommodated in the side portion of the seatback 14. Further, there is a structure in which the upper end 122A of the package 122 that is in this accommodated state is positioned further toward the upper end side of the seatback 14 than the upper side communication port 38 in the inflated and expanded state of the airbag 20. Therefore, there is no need to, in addition to the bellows-folding at the chest/abdomen restraining region 20C, further fold-up the vicinity of the upper side communication port 38 at the airbag 20, and thus, it can be made such that the upper side communication port 38 is not set in a substantially blocked state due to the folding-up. Due thereto, the flow rate balance of the gas (refer to arrows G17, G18 in FIG. 13), that is supplied to the upper portion and the lower portion of the front bag portion 30 at the time of operation of the inflator 26, can be made to be good.

Namely, in a case that is structured such that the upper end 122A of the package 122 is positioned further toward the lower end side of the seatback 14 than the upper side communication port 38 in the inflated and expanded state of the airbag 20, the upper side communication port 38 is substantially blocked due to the folding-up of the upper end portion of the airbag 20. In this case, the gas, that is jetted-out from the upper end opening 72A of the flow regulating cloth 72 into the upper portion of the rear bag portion 32 interior due to operation of the inflator 26, is not supplied smoothly through the upper side communication port 38 to the upper portion of the front bag portion 30 interior. As a result, the flow rate of the gas, that is jetted-out from the lower end opening 72B of the flow regulating cloth 72 into the lower portion of the rear bag portion 32 interior and is supplied through the lower side communication port 40 to the lower portion of the front bag portion 30 interior, becomes too large. Due thereto, the balance of the flow rate of the gas, that is supplied from the upper side communication port 38 to the upper portion of the front bag portion 30 interior, and the flow rate of the gas, that is supplied from the lower side communication port 40 to the lower portion of the front bag portion 30 interior, is poor, and the expansion behavior of the front bag portion 30 is unstable.

With regard to this point, in the present embodiment, the gas, that is jetted-out from the upper end opening 72A of the flow regulating cloth 72 to the upper portion of the rear bag portion 32 interior due to operation of the inflator 26, can be supplied smoothly through the upper side communication port 38 to the upper portion of the front bag portion 30 interior. Due thereto, the balance of the flow rate of the gas, that is supplied from the upper side communication port 38 to the upper portion of the front bag portion 30 interior, and the flow rate of the gas, that is supplied from the lower side communication port 40 to the lower portion of the front bag portion 30 interior, can be made to be good. Due to the above, in the present embodiment, the airbag 20 (and the front bag portion 30 in particular) can be inflated and expanded stably from the lower side toward the upper side.

Moreover, in the present embodiment, as described above, the gas, that is jetted-out from the upper end opening 72A of the flow regulating cloth 72 to the upper portion of the rear bag portion 32 interior, can be supplied smoothly through the upper side communication port 38 to the upper portion of the front bag portion 30 interior. Due thereto, gas can be supplied prioritarily to the upper portion of the front bag portion 30 interior, and not to within the shoulder restraining portion 32A that is provided at the upper portion of the rear bag portion 32. As a result, it can be made such that the shoulder restraining portion 32A does not become too high pressure in the initial stage of inflation and expansion.

Namely, for example, in a case in which the upper end 122A of the package 122 is positioned further toward the lower end side of the seatback 14 than the upper side communication port 38 in the inflated and expanded state of the airbag 20, and further toward the upper end side of the seatback 14 than the upper end opening 72A in the inflated and expanded state of the airbag 20, gas is not supplied smoothly from the upper side communication port 38 to the upper portion of the front bag portion 30. In this case, the flow rate of the gas (refer to arrow G17 in FIG. 13), that heads from the upper end opening 72A toward the shoulder restraining portion 32A, increases, and there is the possibility that the shoulder restraining portion 32A will become too high pressure in the initial stage of inflation and expansion. However, this can be avoided in the present embodiment. Due thereto, for example, even in a case in which the shoulder restraining portion 32A inflates and expands in a state in which the head portion of a child, or the like, exists at an improper position that is the inflation and expansion region of the shoulder restraining portion 32A, the load applied to the head portion of the child, or the like, can be lessened, and therefore, the OOP performance can be improved.

<Supplementary Description of Embodiments>

The above-described respective embodiments are structured such that the side airbag device 10, 70, 80, 80', 90, 100, 120 for a vehicle is provided at the central-side side portion 14A (the side portion that is at the vehicle transverse direction inner side) of the seatback 14, but the present invention is not limited to this. In a case in which the side airbag device for a vehicle of the present invention is provided at the side portion that is at the vehicle transverse direction outer side of a seatback, for example, due to the inflated width of the shoulder restraining portion being thin as in the above-described first embodiment, the expansion performance of the shoulder restraining performance into the narrow gap between the shoulder portion of the vehicle occupant and the vehicle body side portion can be made to be good. Further, in this case, the shoulder portion can be fit into the concave portion that is formed in a vicinity of the shoulder restraining portion at the vehicle transverse direction inner side surface of the airbag, and therefore, inadvertent movement of the shoulder portion with respect to the airbag can be prevented or suppressed by a simple structure.

Further, the above-described respective embodiments are structured such that the airbag 20 is formed to a size that can restrain from the head portion H to the abdomen portion of the vehicle occupant P, but the present invention is not limited to this. For example, as shown by the three-dot chain line in FIG. 1, there may be a structure in which a waist restraining portion 20A is provided at the lower end portion of the airbag 20 (a structure in which the airbag 20 is formed to a size that can restrain from the head portion H to a waist portion L). Further, the above-described respective embodiments are structured such that the front bag portion 30 of the airbag 20 is formed to a size that can restrain the front portions of the chest portion C and the abdomen portion B, and the head portion H, of the vehicle occupant P, and the rear bag portion 32 is formed to a size that can restrain the rear portions of the chest portion C and the abdomen portion B, and the shoulder portion S, of the vehicle occupant P, but the present invention is not limited to this. It suffices for the front bag portion to be a size that can restrain at least the head portion and the front portion of the chest portion of the vehicle occupant, and it suffices for the rear bag portion to be able to restrain at least the rear portion of the chest portion of the vehicle occupant.

Further, the structure of the partitioning portion in the present invention is not limited to the structures of the tethers 24, 102 and the partitioning portions 82, 82', 92 of the above-described respective embodiments. The shape of the front end portion of the shoulder restraining portion that is set by the partitioning portion in the present invention, the width dimension of the shoulder restraining portion, the positions and the number of the communication ports, and the like can be changed appropriately.

Further, although the above-described respective embodiments are structured such that the side airbag device 10 for a vehicle is installed in the vehicle seat 12 (front seat) that is a driver's seat, the present invention is not limited to this. The side airbag device for a vehicle relating to the present invention can be applied also to a front passenger's seat or to a back seat (a rear seat) of the second row of seats or the like of a vehicle.

In addition, the present invention can be implemented by being modified in various ways within a scope that does not depart from the gist thereof. Further, the scope of the right of the present invention is, of course, not limited to the above-described respective embodiments.

The disclosure of Patent Application No. 2013-241323 that is a Japanese application is, in its entirety, incorporated by reference into the present specification. Further, all publications, patent applications, and technical standards mentioned in the present specification are incorporated by reference into the present specification to the same extent as if such individual publication, patent application, or technical standard was specifically and individually indicated to be incorporated by reference.

A reference example is described next. Note that structures/operation that are basically similar to those of the above-described first embodiment are denoted by the same reference numerals as in the above-described first embodiment, and description thereof is omitted.

<Reference Example>

Figure 15:
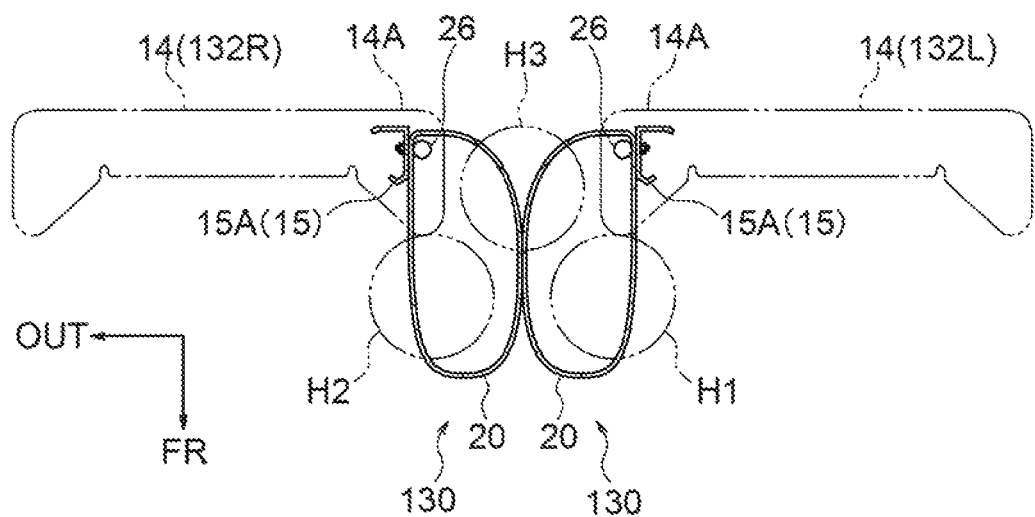
FIG. 15 is a plan sectional view in which a state, in which the airbags have inflated and expanded at side airbag devices for a vehicle relating to a reference example, is seen from the vehicle upper side.

A state, in which airbags have inflated and expanded at side airbag devices 130 for a vehicle relating to a reference example, is shown in FIG. 15 in a plan sectional view seen from the vehicle upper side. In this reference example, the side airbag devices 130 for a vehicle are installed in both the seatback 14 of a seat 132R at the vehicle right side and in the seatback 14 of a seat 132L at the vehicle left side. These side airbag devices 130 for a vehicle are structured basically similarly to the side airbag device 10 for a vehicle relating to the above-described first embodiment, but are structured such that the diffuser 24 in the above-described first embodiment is omitted.

In this reference example, an in-cabin camera (imaging device) is mounted to the ceiling of the vehicle cabin (none of which are illustrated). This in-cabin camera is electrically connected to the ECU 42 (not shown in FIG. 15) that is the control device. At the time when the ECU 42 senses, on the basis of images captured by the in-cabin camera, that an object to be protected, such as the head portion of a child or the like, exists in the inflation and expansion region of at least either one of the left and right airbags 20, the ECU 42 prohibits activation of that at least one inflator 26 even in a case in which the ECU 42 senses a side collision on the basis of a signal from the side collision sensor 44 (not shown in FIG. 15).

For example, in a state in which a head portion H1 of a child is positioned in front of the central-side side portion 14A of the seatback 14 at the vehicle left side, the ECU 42 prohibits activation of the inflator 26 at the side airbag device 130 for a vehicle that is at the vehicle left side. Further, for example, in a state in which a head portion H2 of a child is positioned in front of the central-side side portion 14A of the vehicle right side, the ECU 42 prohibits activation of the inflator 26 at the side airbag device 130 for a vehicle that is at the vehicle right side. Further, for example, in a state in which a head portion H3 of a child is positioned between the left and right seats 132L, 132R, the ECU 42 prohibits activation of both of the left and right inflators 26.

In this reference example, in a state in which an object to be protected, such as the head portion of a child or the like, exists at an improper position (out of position) that is the inflation and expansion region of the airbag 20, the airbag 20 is not inflated and expanded, and therefore, this can contribute to improving the performance of protecting that object to be protected (the so-called OOP performance). Note that this reference example can be applied also to any of the front seats and rear seats of a vehicle. Further, although this reference example is structured such that the tether 24 of the above-described first embodiment is omitted, there may be a structure in which the tether 24 is provided.

EXPLANATION OF REFERENCE NUMERALS 10 side airbag device for vehicle
12 vehicle seat
14 seatback
14A tunnel-side side portion (side portion at vehicle transverse direction inner side)
20 airbag
20H head restraining region
24 tether (partitioning portion)
26 inflator 28 flow regulating cloth (flow regulating member)
28A upper end opening
28B lower end opening
30 front bag portion
32 rear bag portion
32A shoulder restraining portion
32A1 region for restraining center of shoulder portion of vehicle occupant
38 upper side communication port
40 lower side communication port
70 side airbag device for vehicle
72 flow regulating cloth (flow regulating member)
72A upper end opening
72B lower end opening
80 side airbag device for vehicle
82 partitioning portion
84 sewn portion
80' side airbag device for vehicle
82' partitioning portion
90 side airbag device for vehicle
92 partitioning portion
94 first lower side communication port
96 second lower side communication port
100 side airbag device for vehicle
102 tether (partitioning portion)
104 first upper side communication port
106 second upper side communication port
108 first lower side communication port
110 second lower side communication port
112 third lower side communication port
114 fourth lower side communication port
120 side airbag device for vehicle
122A upper end of package (upper end of airbag in folded-up state)

The invention claimed is:

1. A side airbag device for a vehicle comprising:
an inflator that generates gas by activating;
an airbag that is provided at a side portion of a seatback of a vehicle seat, the airbag inflates and expands toward a vehicle front side of the side portion due to gas being supplied to an interior of the airbag by the inflator, the airbag being configured to retrain at least from a chest portion to a head portion of a vehicle occupant located in the vehicle seat; and
a partitioning portion that partitions the airbag into: (i) a rear bag portion that restrains at least a rear portion of the chest portion of the vehicle occupant, and (ii) a front bag portion that restrains a front portion of the chest portion of the vehicle occupant, the partitioning portion including:
 a laterally extending portion extending toward a front side of the seatback from a vertical direction intermediate portion of a rear end portion of the airbag that has inflated and expanded;
 a vertically extending portion extending toward an upper side of the seatback from a longitudinal direction intermediate portion of a lower end portion of the airbag that has inflated and expanded, and,
 a plurality of communication ports formed at the partitioning portion to supply gas from the inflator that is accommodated within the rear bag portion into the front bag portion.

2. The side airbag device for a vehicle of claim 1, further comprising a shoulder restraining portion that restrains at least a portion of a shoulder portion of the vehicle occupant, the shoulder restraining portion being provided at an upper portion of the rear bag portion.

3. The side airbag device for a vehicle of claim 2, wherein the shoulder restraining portion is structured so as to, in an inflated and expanded state of the airbag, project-out further toward the front side of the seatback than a lower portion of the rear bag portion.

4. The side airbag device for a vehicle of claim 3, further comprising a flow regulating member that distributes gas, that is generated from the inflator, to the upper portion and the lower portion of the rear bag portion, wherein
a front end portion of the shoulder restraining portion is structured so as to be formed in an arc shape that is convex toward the vehicle front side, as seen in a side view of the airbag that is in the inflated and expanded state.

5. The side airbag device for a vehicle of claim 2, wherein the partitioning portion is structured by a tether in which the plurality of communication ports are formed, and a width dimension of the tether, at a region that is positioned between the shoulder restraining portion and the front bag portion, is reduced.

6. The side airbag device for a vehicle of claim 1, wherein the partitioning portion partitions the airbag into the front bag portion and the rear bag portion by a sewn portion at which a base cloth of the airbag is sewn, and the plurality of communication ports are formed due to the sewn portion being partially omitted between the front bag portion and the rear bag portion.

7. The side airbag device for a vehicle of claim 1, wherein the plurality of communication ports includes: (i) an upper side communication port that communicates the upper portion of the rear bag portion and an upper portion of the front bag portion in a vertical direction of the airbag, and (ii) a lower side communication port that communicates a lower portion of the rear bag portion and a lower portion of the front bag portion in a longitudinal direction of the airbag.

8. The side airbag device for a vehicle of claim 7, further comprising:
a flow regulating member that is provided within the rear bag portion, the flow regulating member distributes gas, that is generated from the inflator, from an upper end opening and a lower end opening to the upper portion and the lower portion of the rear bag portion,
wherein the flow regulating member is formed in a tubular shape having a diameter that increases from the upper end opening toward the lower end opening.

9. The side airbag device for a vehicle of claim 8, wherein the upper side communication port of the partitioning portion is set so as to face the upper end opening of the flow regulating member, and the lower side communication port of the partitioning portion is set so as to face the lower end opening of the flow regulating member.

10. The side airbag device for a vehicle of claim 9, wherein:
a shoulder restraining portion that restrains a shoulder portion of the vehicle occupant is provided at the upper portion of the rear bag portion, and
the upper end opening of the flow regulating member is set further toward an upper end side of the rear bag portion than a region that restrains a center of the shoulder portion of the vehicle occupant at the shoulder restraining portion.

11. The side airbag device for a vehicle of claim 7, wherein an opening surface area of the lower side communication port is set to be greater than an opening surface area of the upper side communication port.

12. The side airbag device for a vehicle of claim 7, wherein
- at the airbag, a head restraining region that is further toward an upper side than the partitioning portion is folded-up by roll-folding or bellows-folding toward a lower side of the airbag, and a region that is further toward a lower side than the head restraining region is folded-up by roll-folding or bellows-folding toward the lower side of the airbag and a rear side of the airbag, and the airbag is accommodated in the side portion of the seatback in a folded-up state, and
- an upper end of the airbag in an accommodated state is structured so as to be positioned further toward an upper end side of the seatback than the upper side communication port in the inflated and expanded state of the airbag.

13. The side airbag device for a vehicle of claim 12, further comprising:
- a flow regulating member that is provided within the rear bag portion, the flow regulating member distributes gas, that is generated from the inflator, from an upper end opening and a lower end opening to the upper portion and the lower portion of the rear bag portion, wherein the upper side communication port of the partitioning portion is set so as to face the upper end opening of the flow regulating member; and
- a shoulder restraining portion that restrains at least a portion of a shoulder portion of the vehicle occupant, the shoulder restraining portion being provided at the upper portion of the rear bag portion.

* * * * *